(12) United States Patent
Stanley et al.

(10) Patent No.: US 11,197,403 B2
(45) Date of Patent: Dec. 14, 2021

(54) APPARATUS AND METHOD FOR LAND CLEARING AND PREPARATION

(71) Applicant: Fecon, LLC, Lebanon, OH (US)

(72) Inventors: Jeffrey T. Stanley, Lebanon, OH (US); Steven K. Watson, Lebanon, OH (US)

(73) Assignee: Fecon, LLC, Lebanon, OH (US)

( * ) Notice: Subject to any disclaimer, the term of this patent is extended or adjusted under 35 U.S.C. 154(b) by 218 days.

(21) Appl. No.: 16/400,745

(22) Filed: May 1, 2019

(65) Prior Publication Data

US 2019/0335648 A1 Nov. 7, 2019

Related U.S. Application Data

(60) Provisional application No. 62/665,221, filed on May 1, 2018.

(51) Int. Cl.
*A01B 35/28* (2006.01)
*A01B 33/14* (2006.01)
*A01G 3/00* (2006.01)
*A01G 23/093* (2006.01)

(52) U.S. Cl.
CPC ............ *A01B 35/28* (2013.01); *A01B 33/142* (2013.01); *A01G 3/002* (2013.01); *A01G 23/093* (2013.01)

(58) Field of Classification Search
CPC ..... A01B 33/142; A01B 33/14; A01B 33/144; A01B 33/146; A01B 33/103; A01B 35/28; A01G 23/093; A01G 3/002; B27B 33/08
See application file for complete search history.

(56) References Cited

U.S. PATENT DOCUMENTS

| | | | |
|---|---|---|---|
| 4,231,406 A | 11/1980 | Jonsson | |
| 4,329,091 A | 5/1982 | Erkfritz | |
| 4,621,955 A | 11/1986 | Briese | |
| 4,667,713 A | 5/1987 | Wright | |
| 4,682,916 A * | 7/1987 | Briese | B23B 27/10 |
| | | | 407/103 |
| 4,709,737 A | 12/1987 | Jonsson | |
| 4,738,291 A | 4/1988 | Isley | |
| 4,932,447 A | 6/1990 | Morin | |
| 5,085,112 A * | 2/1992 | MacLennan | B23D 61/065 |
| | | | 83/840 |
| 5,131,305 A * | 7/1992 | MacLennan | B23D 61/065 |
| | | | 83/840 |
| 5,135,035 A | 8/1992 | Mills | |

(Continued)

*Primary Examiner* — Jessica H Lutz
(74) *Attorney, Agent, or Firm* — Ulmer & Berne LLP

(57) ABSTRACT

A land preparation tool. The tool body can have a longitudinal axis, and include a first imaginary plane and a second imaginary plane. The first and second imaginary planes can intersect orthogonally at the longitudinal axis. The tool body can also include a concave cutting surface tapering from a proximal midpoint to a distal edge comprising a circular blade, and a multi-faceted surface mounting interface disposed on the tool body opposite the cutting surface. The mounting interface can have a plurality of beveled surfaces defining a first pair of V-shaped surfaces and a second pair of V-shaped surfaces, wherein a first apex of the first pair of V-shaped surfaces is disposed in the first imaginary plane and a second apex of the second pair of V-shaped surfaces is disposed in the secondary imaginary plane. A channel can be disposed into the mounting interface and extend into the tool body.

20 Claims, 27 Drawing Sheets

(56) References Cited

U.S. PATENT DOCUMENTS

| | | |
|---|---|---|
| 5,205,199 A | 4/1993 | MacLennan |
| 5,207,748 A | 5/1993 | Katbi et al. |
| 5,211,212 A | 5/1993 | Carlson et al. |
| 5,307,719 A | 5/1994 | MacLennan |
| 5,333,938 A | 8/1994 | Gale |
| 5,477,754 A * | 12/1995 | Herbon ............... B23B 27/141 407/113 |
| 5,644,965 A | 7/1997 | MacLennan et al. |
| 5,647,263 A | 7/1997 | Wildey |
| 5,873,534 A | 2/1999 | Shinn |
| 6,047,749 A | 4/2000 | Lamb |
| 6,050,752 A | 4/2000 | DeRoche |
| 6,601,620 B1 | 8/2003 | Monyak et al. |
| D486,503 S | 2/2004 | East |
| D488,174 S | 4/2004 | East |
| 6,725,758 B2 | 4/2004 | MacLennan et al. |
| 6,810,783 B1 | 11/2004 | Larose |
| D517,104 S | 3/2006 | East |
| 7,461,675 B2 | 12/2008 | Eriksson |
| 7,634,897 B2 | 12/2009 | MacLennan et al. |
| 7,713,006 B2 | 5/2010 | MacLennan et al. |
| D647,928 S | 11/2011 | MacLennan et al. |
| 8,540,033 B2 | 9/2013 | Stanley et al. |
| D757,124 S | 5/2016 | Stanley et al. |
| D772,951 S | 11/2016 | Stanley et al. |
| D791,195 S | 7/2017 | Stanley et al. |
| D795,929 S | 8/2017 | Stanley et al. |
| D795,931 S | 8/2017 | Stanley et al. |
| D804,551 S | 12/2017 | Rhode |
| D812,115 S | 3/2018 | MacLennan et al. |
| D821,455 S | 6/2018 | Stanley et al. |
| D835,680 S | 12/2018 | Stanley et al. |
| D835,681 S | 12/2018 | Stanley et al. |
| D835,682 S | 12/2018 | Stanley et al. |
| D836,137 S | 12/2018 | Stanley et al. |
| D861,740 S | 10/2019 | Stanley et al. |
| 2007/0151430 A1* | 7/2007 | Maclennan ............ B28D 1/125 83/13 |
| 2007/0193428 A1 | 8/2007 | MacLennan et al. |
| 2007/0261762 A1* | 11/2007 | Eriksson ............... B27L 1/08 144/208.1 |
| 2011/0100658 A1 | 5/2011 | Stanley et al. |
| 2015/0360385 A1 | 12/2015 | Shaver et al. |
| 2017/0079219 A1* | 3/2017 | Stanley ............... B02C 18/145 |

\* cited by examiner

# APPARATUS AND METHOD FOR LAND CLEARING AND PREPARATION

BACKGROUND

The present disclosure relates to attachment systems and methods for land preparation tools, such as cutting, grinding, mulching, and/or shredding tools, and more particularly tool interfaces for attachments to powered vehicles.

Land preparation and clearing machines and apparatus such as forestry machines and apparatus are utilized for clearing land, creating paths, and otherwise removing debris, brush, trees, vegetation, soil, concrete, asphalt, rock, and/or other materials, making the land suitable for further development or use. To carry out these tasks, such machines can be fitted with land preparation attachments or apparatus operable to mulch, cut, shred, and/or grind vegetation, brush, trees, stumps, soil, concrete, asphalt, rock, and other materials.

In particular, the apparatus may be integrally or detachably attached to a tractor, skid steer, or other vehicle to facilitate articulation and movement of the mowing apparatus with respect to the vegetation. Often, the vehicle is a multi-purpose vehicle having the capability to be fitted with any of a variety of attachments suitable for the task at hand. For example, the vehicle can include a common connection for connecting to and driving the apparatus such as brush cutters, rotary mowers, shredders, grinders, and crushers. Such land preparation and clearing apparatus can be hydraulically driven via hydraulic power from the vehicle. One illustrative type of land preparation and clearing apparatus is known as a "flail mower" which utilizes a rotatable axle with either swinging or fixed position cutting tools (often known as "flails").

SUMMARY

According to an embodiment, a land preparation apparatus comprising a rotatable drum and a plurality of tool assemblies disposed on the rotatable drum is provided. Each tool assembly comprises a tool holder comprising a mounting surface defining a non-planar profile, and a land preparation tool connected to the tool holder and comprising a mounting surface in flush contact with the tool holder mounting surface. The mounting surface of the land preparation tool defines a non-planar profile which is the inverse of the non-planar profile of the tool holder mounting surface.

The embodiments of the disclosure will be more fully understood in view of the following detailed description, in conjunction with the drawings.

BRIEF DESCRIPTION OF THE DRAWINGS

The following detailed description of embodiments can be best understood when read in conjunction with the drawings enclosed herewith.

Figure 1:
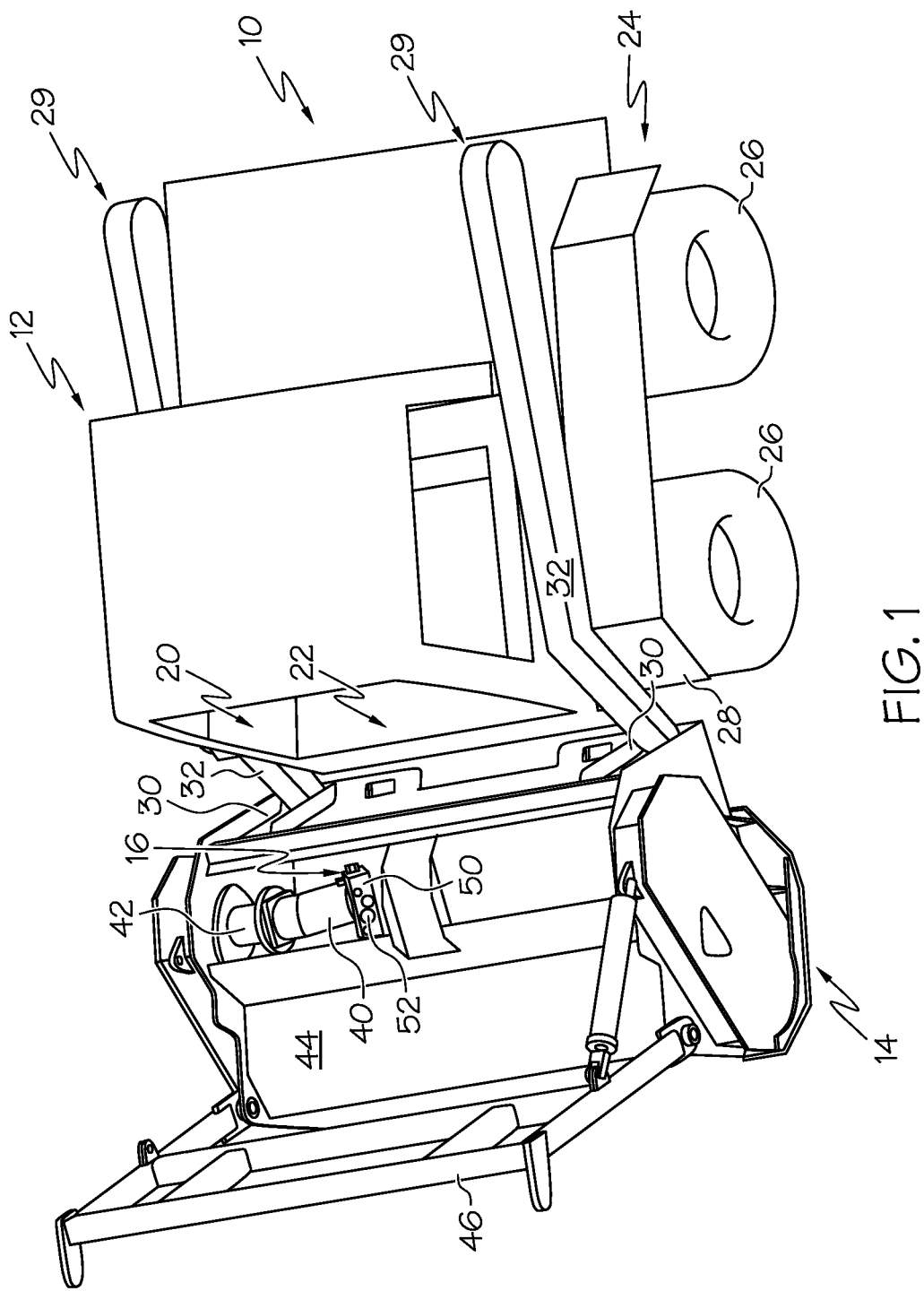
FIG. 1 is a top isometric view of an illustrative land preparation and clearing machine according to one or more embodiments.

The embodiments set forth in the drawings are illustrative in nature and not intended to be limiting of the invention defined by the claims. Moreover, individual features of the drawings and the disclosure will be more fully apparent and understood in view of the detailed description.

DETAILED DESCRIPTION

The present disclosure is generally directed to land preparation and clearing machines ("land preparation machines") that are designed to cut, grind, mulch, shred, clear, mill, and/or mix trees, brush, ground cover, vegetation, debris, asphalt, concrete, and/or soil. The land preparation machines and their corresponding implements may comprise a variety of vehicles and implements, including but not limited to skid steer vehicles, forestry machines and vehicles, PTO tractors, farm tractors and/or any other known vehicles and their corresponding implements compatible with land preparation and clearing. Such land preparation machines may prepare the surface and subsurface of the earth. As used herein, the phrases "land preparation and clearing" and "land preparation" will mean any land preparation and clearing operations, including but not limited to forestry operations such as cutting, grinding, mulching, shredding, clearing, milling, and/or mixing trees, brush, ground cover, vegetation, debris, soil, rock, asphalt, concrete, and/or soil. As used herein, "feed material" describes trees, brush, ground cover, vegetation, debris, soil, rock, asphalt, concrete, and/or soil produced from such land preparation and clearing operations, including but not limited to forestry operations such as clearing land, cutting and/or mulching trees, and/or preparing land surfaces (e.g., creating paths).

Figure 2:
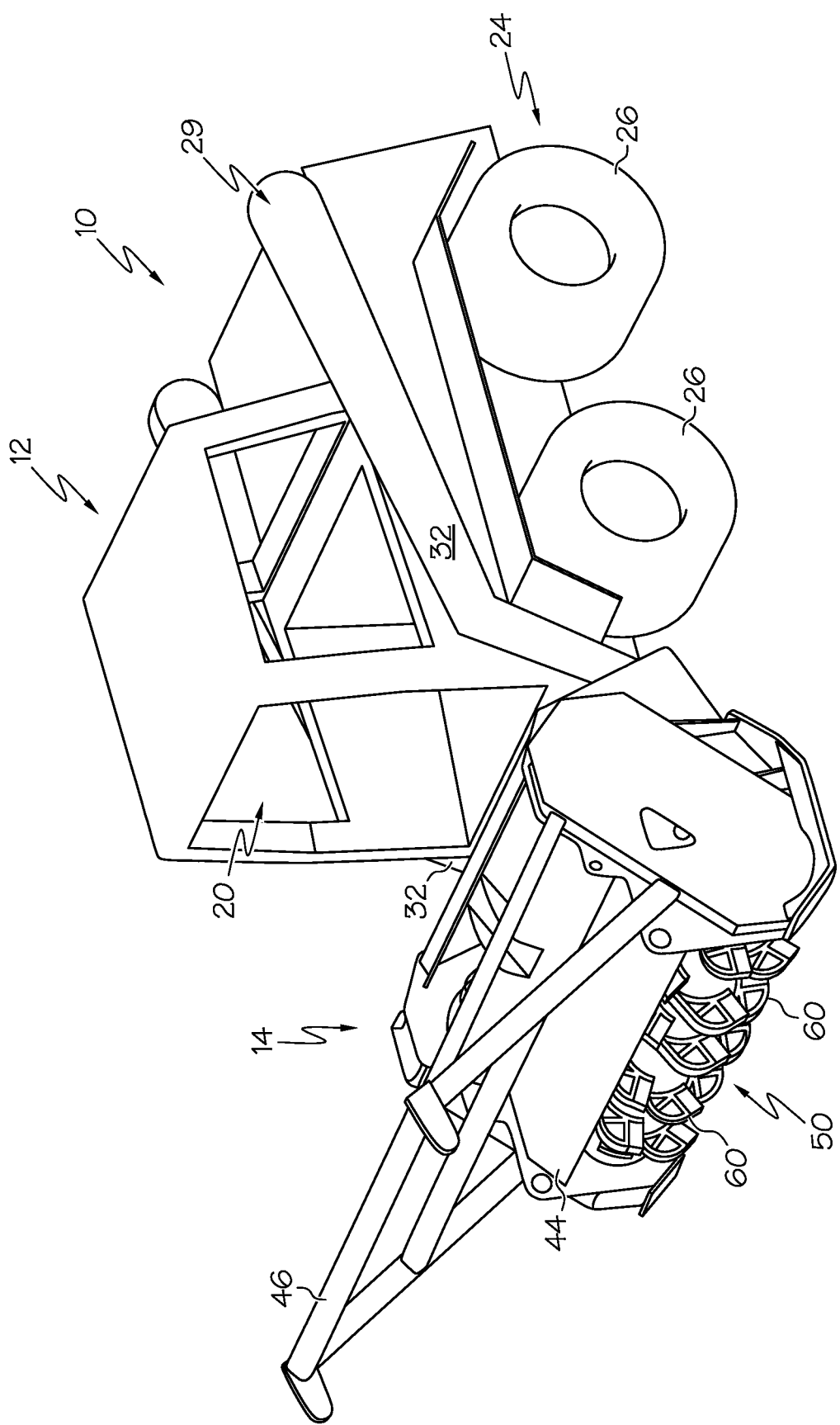
FIG. 2 is a isometric view of the illustrative land preparation and clearing machine of FIG. 1.

Referring to FIGS. 1-2, an illustrative embodiment of a land preparation machine 10 includes a vehicle 12 (e.g., a forestry vehicle) and a land preparation apparatus 14 connected to the vehicle 12. In this illustrative embodiment, the vehicle 12 is a skid steer vehicle suitable for off-road travel, and includes a driver station 20 as well as an all-terrain wheel assembly 24. The wheel assembly 24 may include tires 26. In addition, tires 26 may drive all-terrain tracks (not shown), which may provide traction for the vehicle 12 to move over a variety of terrains and in a variety of conditions. The all-terrain tracks may comprise metal or rubber-based tracks that wrap around tires 26 as known to one of ordinary skill in the art. The vehicle 12 also includes a hydraulically operated vertical lift assembly 29 for vertically lifting the land preparation apparatus 14, and any other attachments that may be used with the vehicle. Controls 22 can be provided for control of the hydraulic lift assembly 29, including the lift arms 32 as well as for controlling the power provided to the wheel assembly 24 and for controlling the operation of the land preparation apparatus 14.

While the land preparation apparatus 14 is shown in this example connected to and powered by vehicle 12 which is a skid steer vehicle, other suitable all-terrain vehicles with capability for powering and utilizing a hydraulic motor attachment or tool (e.g., such as land preparation apparatus 14) could be provided, such as other forestry vehicles, mini-track loaders, excavators, backhoes, PTO tractors, farm tractors, and/or any other known vehicles and their corresponding implements compatible with land preparation and clearing. Further examples of suitable skid steer vehicles are shown and described in U.S. Pat. Nos. 4,168,757 and 4,209,071, the entire disclosures of which are hereby incorporated by reference herein.

In the illustrative embodiment shown in FIGS. 1 and 2, the land preparation apparatus 14 is removably connectable to the vehicle 12. The connection between the land preparation apparatus 14 (or any other attachment) and the vehicle 12 can be accomplished in any of a variety of manners, such as by providing receptacles 30 for receiving vertical lift arms 32 from the vehicle 12. The land preparation apparatus 14, in this example, further includes a hydraulic supply connection for receiving an operating supply of hydraulic fluid from a pump within the vehicle to power the land preparation apparatus 14, and a hydraulic return connection for returning hydraulic fluid to a tank within the vehicle 12. The hydraulic supply and return connections may comprise convention quick-disconnect connections as known to one of ordinary skill in the art.

It is understood that land preparation apparatus 14 may also be fixedly attached to the vehicle 12 and/or be a stand-alone machine such as a walk behind land preparation apparatus. Also, it is understood that other hydraulically-operated rotary mowing or cutting attachments may be utilized with principles of one or more of the embodiments shown and described herein, integral with or detachable from vehicle 12, and/or separately from or in combination with the land preparation apparatus 14. Other configurations are also possible, such as where the fluid pump and tank are located at other locations. Connection, powering, and movement of the land preparation apparatus 14 can be accomplished with various configurations, such as those described in U.S. Pat. Nos. 4,148,366, and 5,813,792, for example, which are hereby incorporated herein by reference.

Figure 3A:
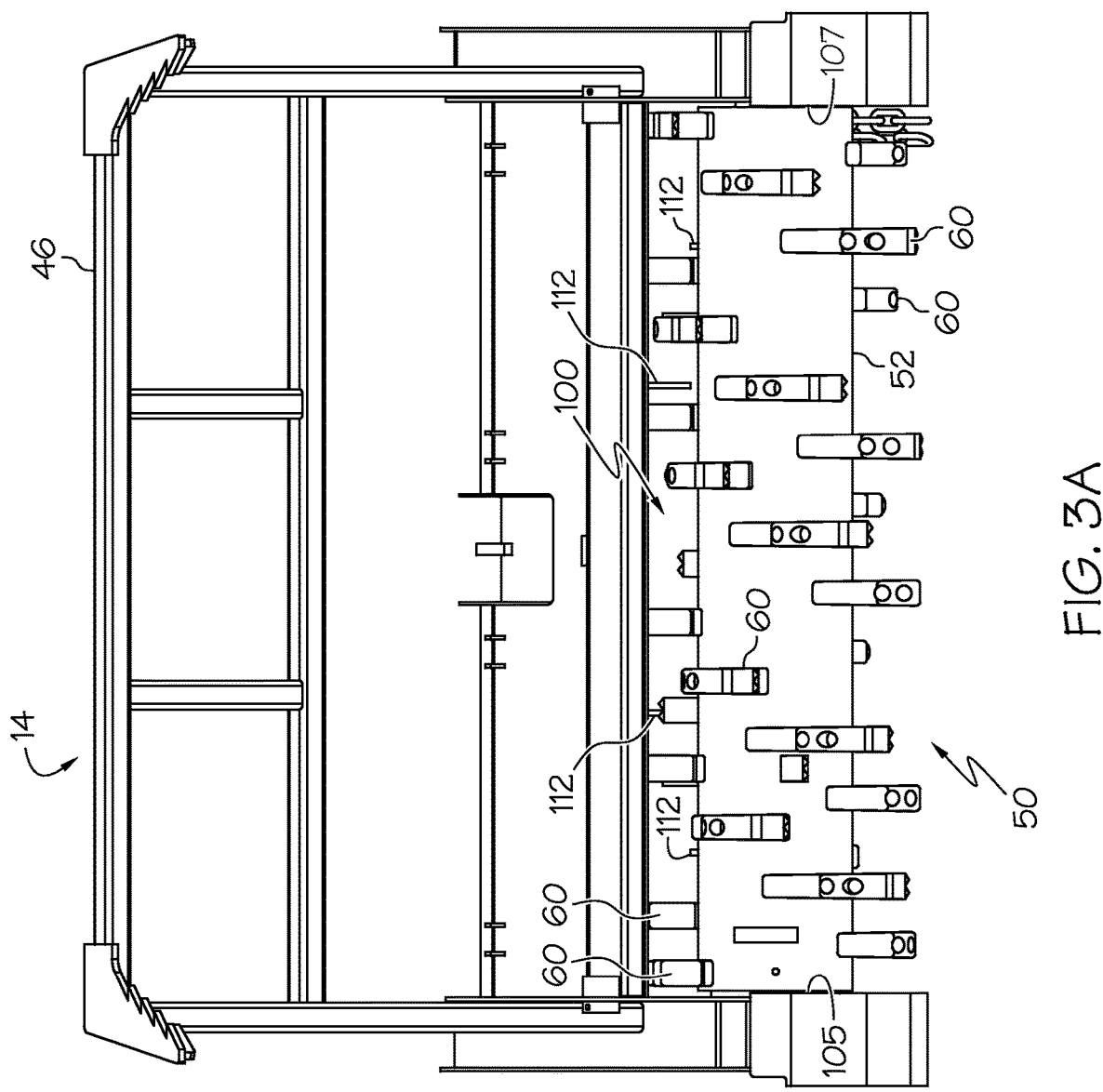
FIG. 3A is a front elevational view of an illustrative land preparation apparatus according to one or more embodiments.

Referring to FIGS. 1-3A, the land preparation apparatus 14 may include a housing 44 forming a chamber 100, right and left end plates 105 and 107, respectively, connected to the housing 44, and a movable tool (e.g., rotatable tool 50) movably (e.g., rotatably) connected to and between the right and left end plates 105 and 107 within the chamber 100. Right and left end plates 105 and 107 may alternatively be integral with the housing 44. In this illustrative embodiment, the rotatable tool 50 comprises a rotatable drum 52 or rod and a plurality of tool assemblies 60 spaced along and extending radially from the tool drum 52 as shown in FIGS. 2 and 3A. For additional details regarding the arrangement of tool assemblies 60 on the rotatable drum, U.S. Publication No. 2009/0050341 A1 has been incorporated by reference herein in its entirety. FIGS. 4A-14B shows multiple illustrative embodiments of tool assemblies 60 in accordance with one or more embodiments.

Optionally, rotatable tool 50 may also comprise an axle 56 extending longitudinally from either one or both ends of the tool drum 52. For movement of the rotatable tool 50, a hydraulic motor 40, such as a hydraulic piston motor, provides rotation of a rotor (e.g., drive shaft 42) which drives the rotatable tool drum 52, which thereby causes rapid rotation of the tool assemblies 60, such as at speeds of between about 100 to about 3000 rpm. The drive shaft 42 may drive a belt (not shown), which engages and drives the axle 56 to turn tool drum 52. Alternatively, the drive shaft 42 may be directly connected to the drum 52 or axle 56.

In one particular embodiment, the hydraulic lift arms 32 raise and lower the land preparation apparatus 14 via controls 22 to allow the tool assembly 60 (e.g., the teeth or cutters of the tool assembly 60) to come into contact with brush, trees, vegetation, or other objects to be cut or shredded or cleared. Controls 22 may also control the supply of fluid to the hydraulic motor 40 to start and stop the rotation of the tool drum 52 and tool assemblies 60. The land preparation apparatus 14 may include any number of suitable components, cutters, grinders, mixers, and/or tools for providing a cutting, grinding, mulching, shredding, clearing, milling, and/or mixing function. In addition, the land preparation apparatus may comprise safety mechanisms such as a guard assembly 46 as shown in FIGS. 1-3A.

In yet another illustrative embodiment, the hydraulic motor 40 is controlled by a hydraulic brake 16 which automatically slows the motor 40 when the flow of hydraulic fluid to the motor via the hydraulic supply line is discontinued. For additional detail on land preparation machinery (e.g., forestry machinery) or hydraulic components associated with land preparation machinery (e.g., forestry machinery), U.S. Publication No. 2006/0032222 has been incorporated by reference in its entirety herein.

Referring to the embodiments of FIGS. 3B-11B, each tool assembly 60 comprises a tool holder 62 and a land preparation tool 66. As will be described herein in view of the figures, the term "land preparation tool" includes, but is not limited to a cutter, blade, grinder, chipper, knife, hammer tool, milling tool, flailing tool or element, carbide tip, steel tip, composite tip, any other tool for suitable for land surface preparation and clearing as described and defined above herein, or any combination thereof. The tool assemblies 60, and any of its components, may be fabricated from a variety of metals, composites, plastics, or combinations thereof. Additional detail regarding tool assemblies is provided in U.S. Pat. Nos. 4,223,441 and 4,222,418, which are hereby incorporated by reference herein. Further as will be described herein in view of the figures, the term "tool holder" is a support structure for the land preparation tool. The land preparation tool 66 may be directly connected to the tool holder 62 as shown in FIGS. 4A-8A or may be connected to the tool holder 62 via an intermediate connector 76 as will be described in detail below and shown in FIGS. 9A-11B. As used herein, "connected" may mean fixedly connected (for example, by welding together the tool holder 62, the land preparation tool 66, and optionally the intermediate connector 76) or removably connected (for example, by bolting, matingly coupling, adhering, or magnetically coupling the tool holder 62, the land preparation tool 66, and optionally the intermediate connector 76). If removable, the land preparation tool 66 may comprise a replaceable tip that is designed to be replaced once worn due to use, permitting the tool holder 62 to remain affixed to the tool drum 52 while the tool 66 is replaced.

Figure 4A:
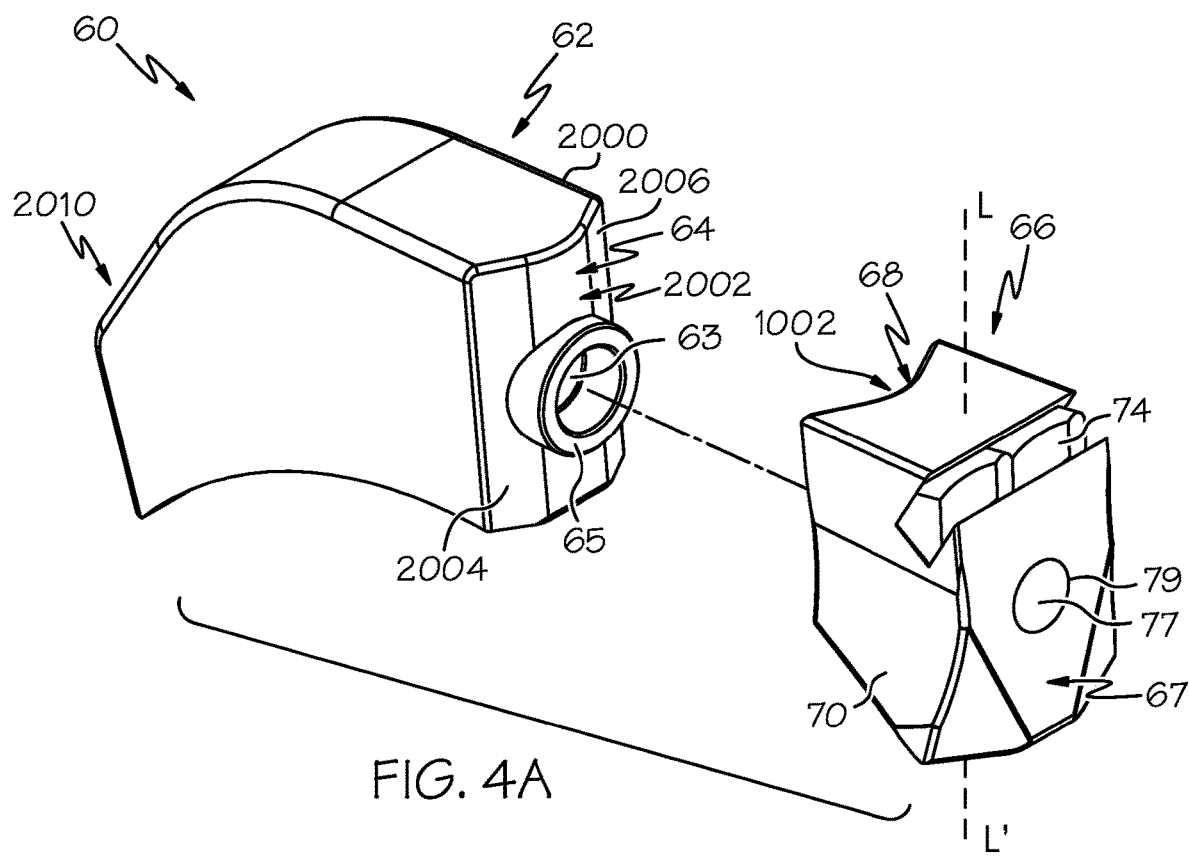
FIG. 4A is an exploded isometric view of an illustrative tool assembly comprising a tool holder, and a land preparation tool according to one or more embodiments.
Figure 4B:
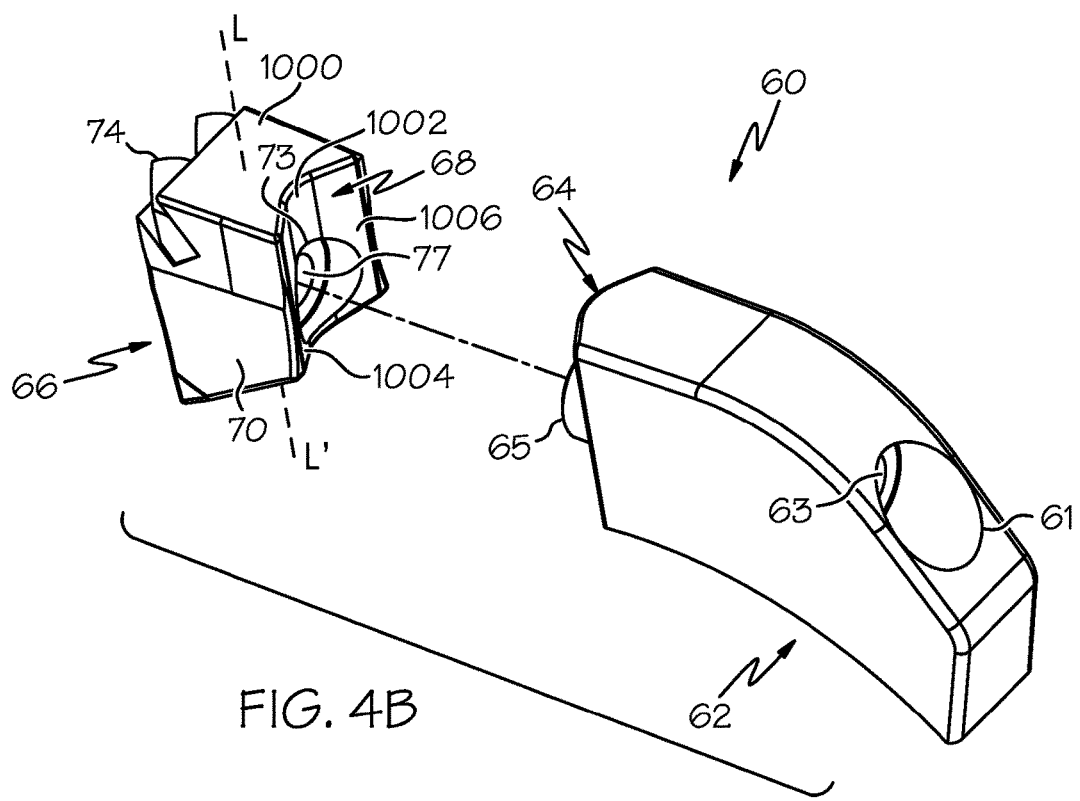
FIG. 4B is a rotated, exploded isometric view of the illustrative land preparation tool of FIG. 4A which shows the mounting surface of the illustrative land preparation tool according to one or more embodiments.
Figure 5A:
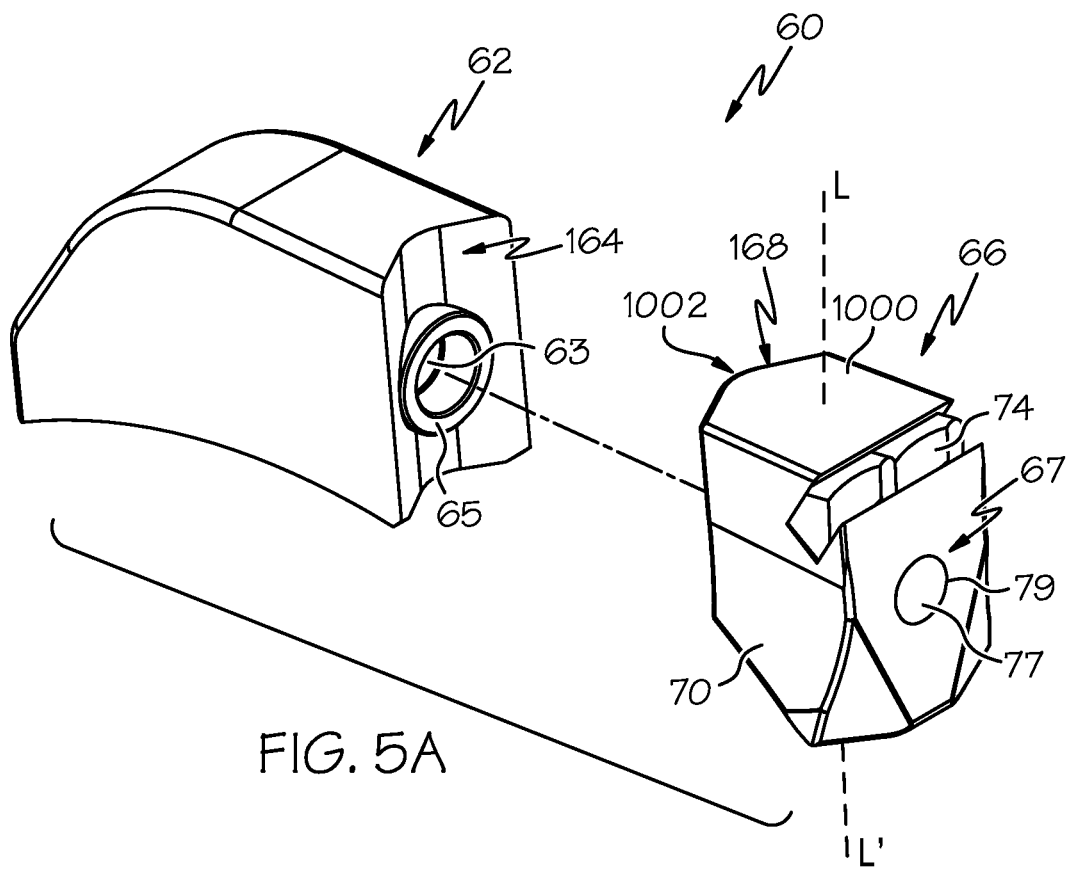
FIG. 5A is an exploded isometric view of another illustrative tool assembly comprising a tool holder, and a land preparation tool according to one or more embodiments.

Referring to the embodiment of FIGS. 4A and 4B, the tool holder 62 comprises a mounting surface 64 defining a non-planar profile. As used herein, non-planar profile defines any surface, which is not a straight planar surface, for example, V-shaped, concave, convex, or combinations thereof. As shown in the embodiment of FIG. 4A, the non-planar profile of the tool holder mounting surface 64 may define a convex V-shape, wherein the mounting surface 64 tapers outwardly towards the middle of the tool holder mounting surface 64. Referring to an alternative embodiment as shown in FIG. 5A, the non-planar profile of the tool holder mounting surface 164 may define a concave V-shape, wherein the mounting surface 164 tapers inwardly towards the middle of the tool holder mounting surface 164.

Figure 5B:
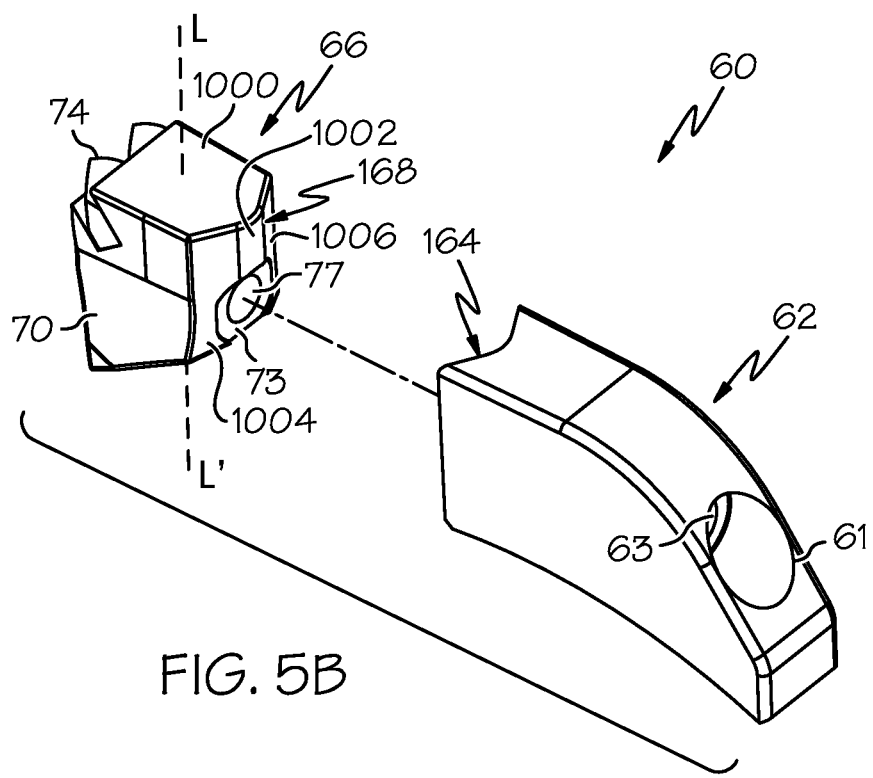
FIG. 5B is a rotated, exploded isometric view of the illustrative land preparation tool of FIG. 5A which shows the mounting surface of the illustrative land preparation tool according to one or more embodiments.

Referring to FIGS. 4A and 4B, each land preparation tool 66 may also comprise a mounting surface 68, which defines a non-planar profile which is the inverse of the non-planar profile of the tool holder mounting surface 64. As shown in FIG. 4B, the mounting surface 68 of the land preparation tool 66 may define a concave V-shape, which is the inverse of the convex V-shape configuration of the tool holder mounting surface 64. In an alternative embodiment as shown in FIG. 5B, the mounting surface 168 of the land preparation tool 66 defines a convex V-shape, which is the inverse of the concave V-shape configuration of the tool holder mounting surface 164. As a result of the inverse non-planar profiles of the mounting surfaces, flush contact may be achieved when the tool holder 62 and land preparation tool 66 are connected. This yields an interference fit or a friction fit between the inverse surfaces 64 and 68, which combats sliding (e.g., horizontal sliding) of the tool holder 62 or land preparation tool 66.

Figure 7A:
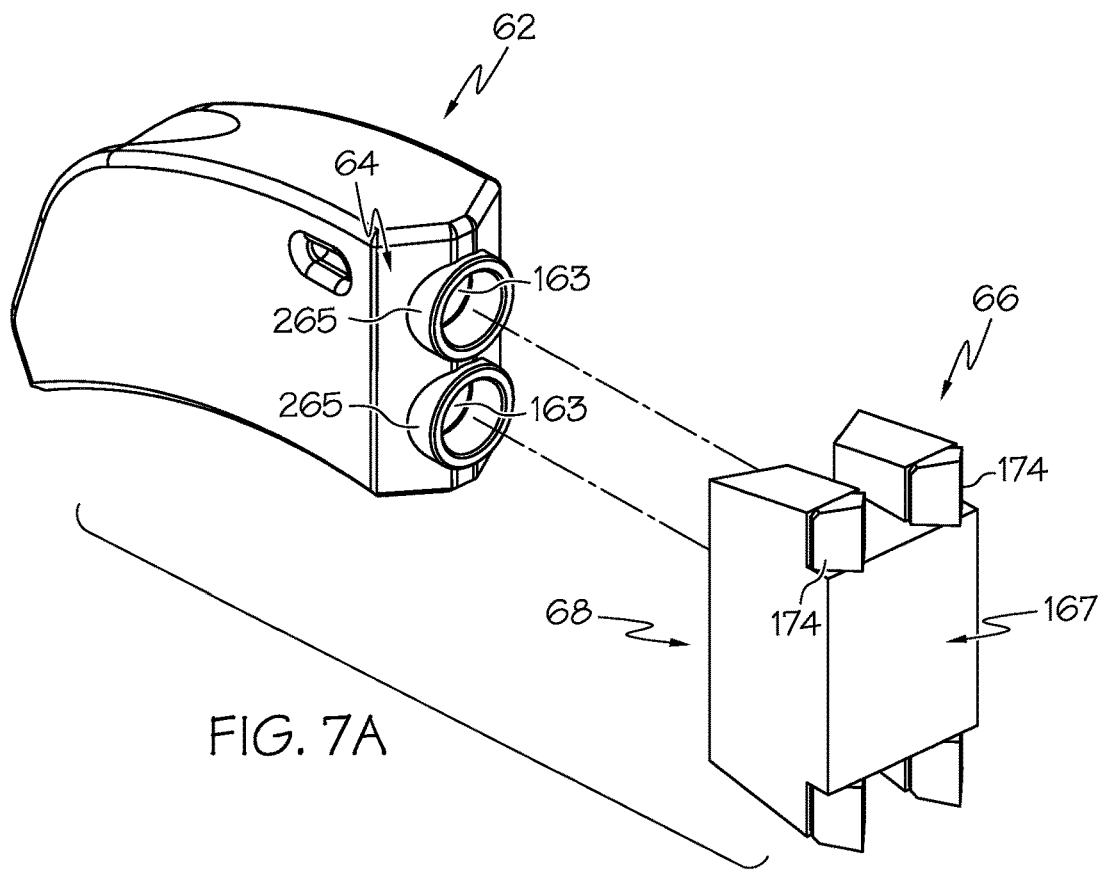
FIG. 7A is an exploded isometric view of yet another illustrative tool assembly comprising a tool holder, and a land preparation tool comprising pairs of upper and lower cutting blades according to one or more embodiments.
Figure 7B:
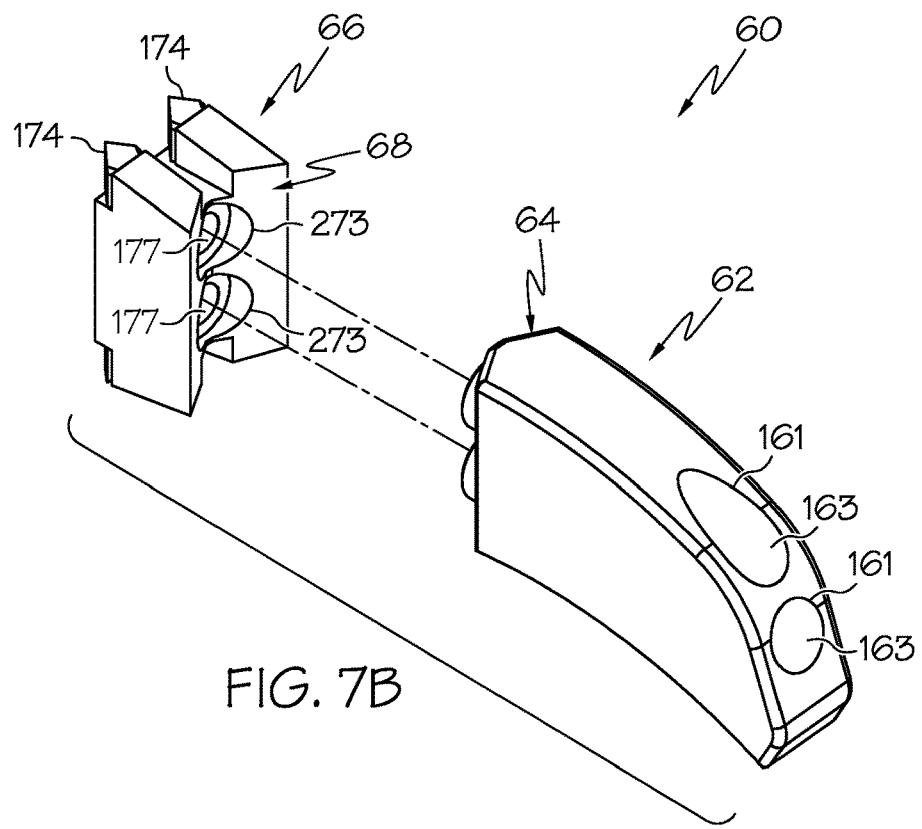
FIG. 7B is a rotated, exploded isometric view of the illustrative tool assembly of FIG. 7A according to one or more embodiments.

In addition to the interference fit between inverse surfaces 64 and 68, other coupling arrangements are further contemplated. Referring again to FIGS. 4A and 4B, each tool holder 62 may comprise a coupling mechanism 65 disposed on the mounting surface 64 of the tool holder 62. As shown in the embodiment of FIGS. 4A and 4B, the coupling mechanism may comprise at least one rounded bushing or peg 65 extending from the mounting surface 64 of the tool holder 62. The rounded peg 65 of FIGS. 4A and 4B may be hollow with a channel 63 therein, wherein the channel 63 extends from the rounded peg 65 to an opening 61 disposed on the opposite end of the tool holder 62. While FIGS. 4A and 4B depict only one channel 63 extending through the tool holder 62, it is contemplated to have more than one channel. In the illustrative embodiment of FIGS. 7A and 7B, the tool holder 62 comprises a pair of rounded pegs 265 with a pair of rounded channels 163 disposed therein. As shown in FIGS. 7A and 7B, the one peg is disposed above the other peg;

however, a side-by-side configuration of rounded pegs (not shown) is also contemplated herein.

Figure 6A:
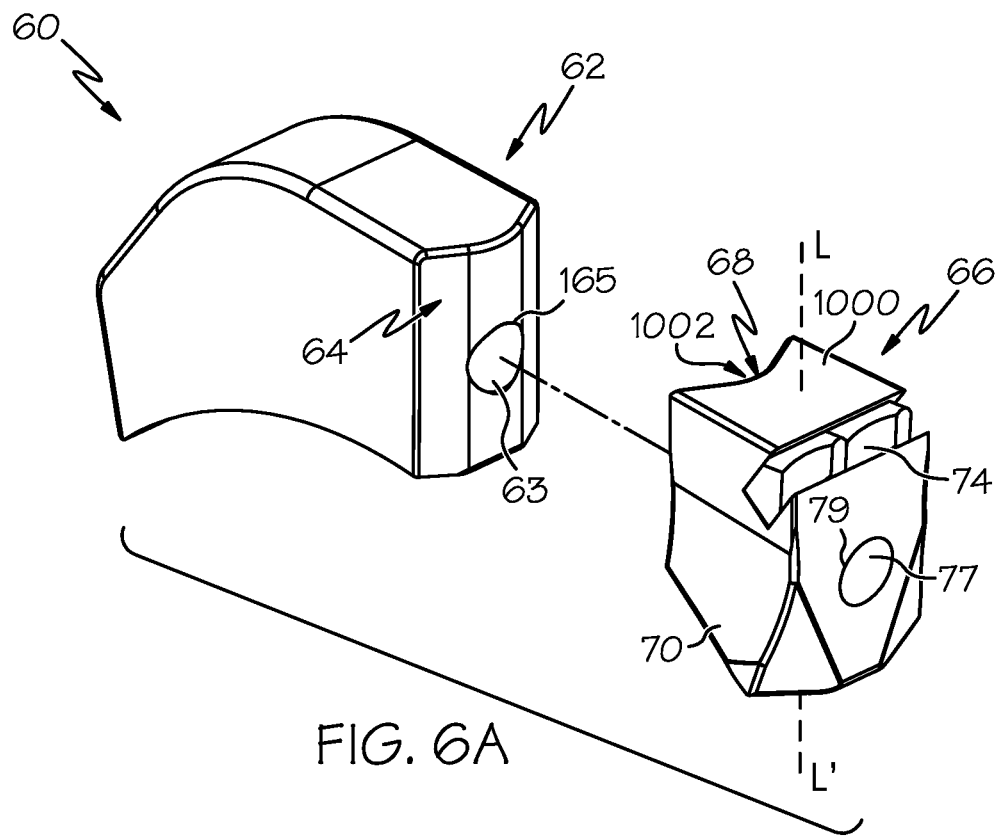
FIG. 6A is an exploded isometric view of yet another illustrative tool assembly comprising a tool holder, and a land preparation tool according to one or more embodiments.
Figure 6B:
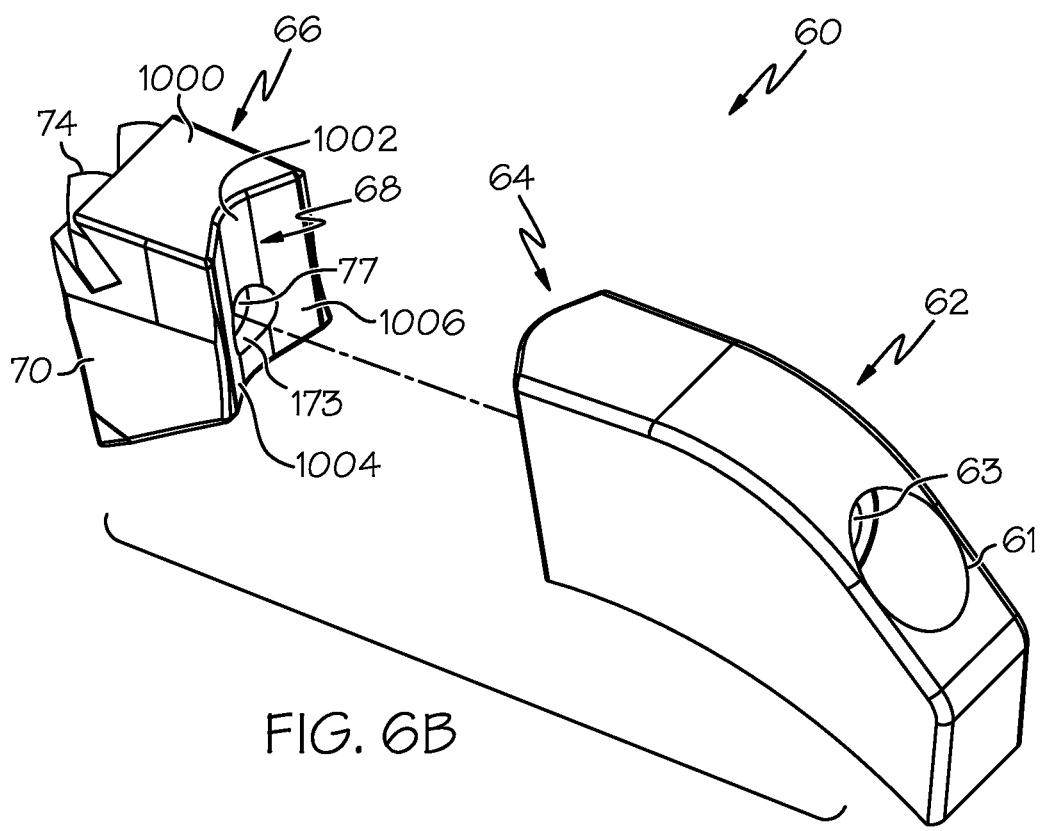
FIG. 6B is a rotated, exploded isometric view of the illustrative land preparation tool of FIG. 6A which shows the mounting surface of the illustrative land preparation tool according to one or more embodiments.

In yet another embodiment as shown in FIGS. 6A-6B, the tool holder 62 may lack a rounded peg or comparable coupling mechanism on the mounting surface 64; however, the tool holder 62 may still include a channel 63 extending from opening 165 on the mounting surface 64 to opening 61 disposed on the opposite end of the tool holder 62. The FIGS. 9A and 9B embodiments also lack a coupling mechanism but include two channels 163 extending from openings 465 on the mounting surface 64 to openings 161 disposed on the opposite end of the tool holder 62. Moreover, the opposite mating arrangement to the illustrative embodiments of FIGS. 4A-5B, and 7A-7B is contemplated. For example, the tool holder 62 may comprise at least one round recess and the land preparation tool 66 may comprise at least one round peg which may be matingly inserted into the round recess of the tool holder 62. Although the present embodiments depict rounded pegs or rounded recesses, other shapes, for example square or rectangular pegs are also contemplated herein.

Additionally, although the figures generally depict channels 63 and 163 with circular tube shapes, other channel shapes and configurations are contemplated herein. Moreover, the channel 63 may be a threaded channel (not shown) disposed inside hollow pegs 65; however, it is contemplated to use non-hollow pegs without channels extending therethrough.

Figure 8A:
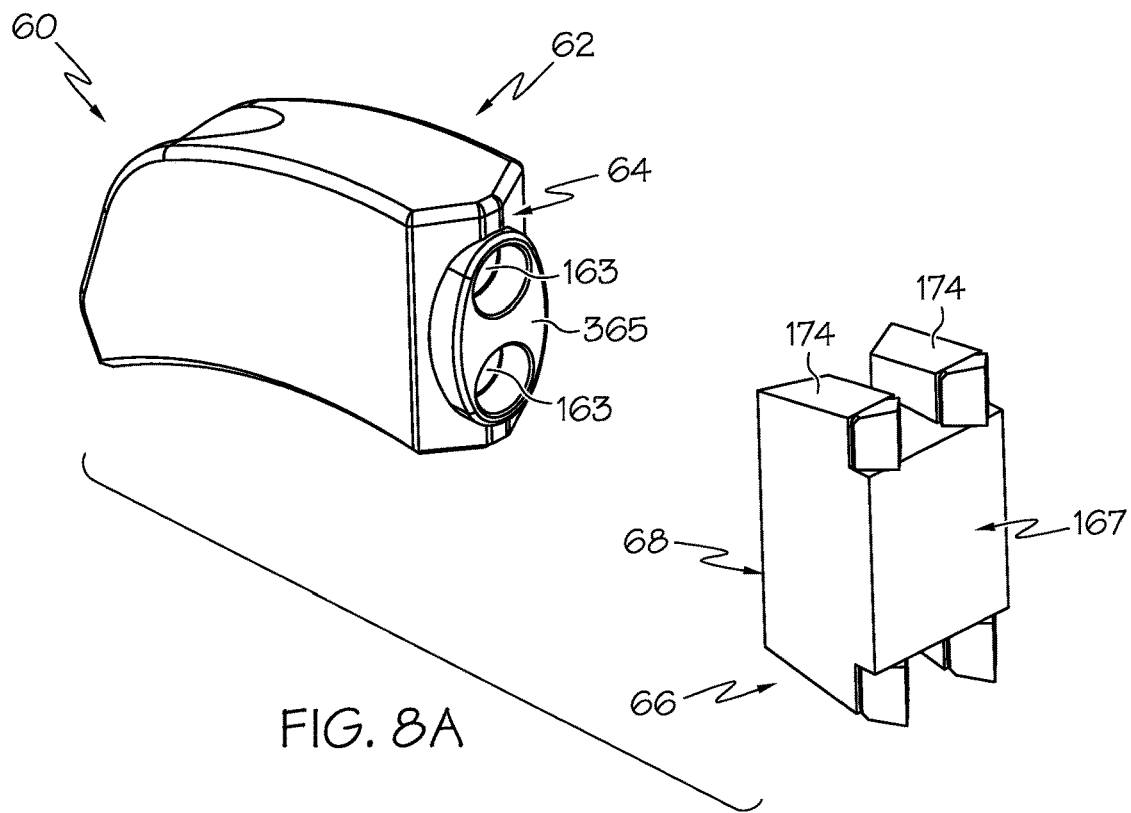
FIG. 8A is an exploded isometric view of another illustrative tool assembly according to one or more embodiments.
Figure 8B:
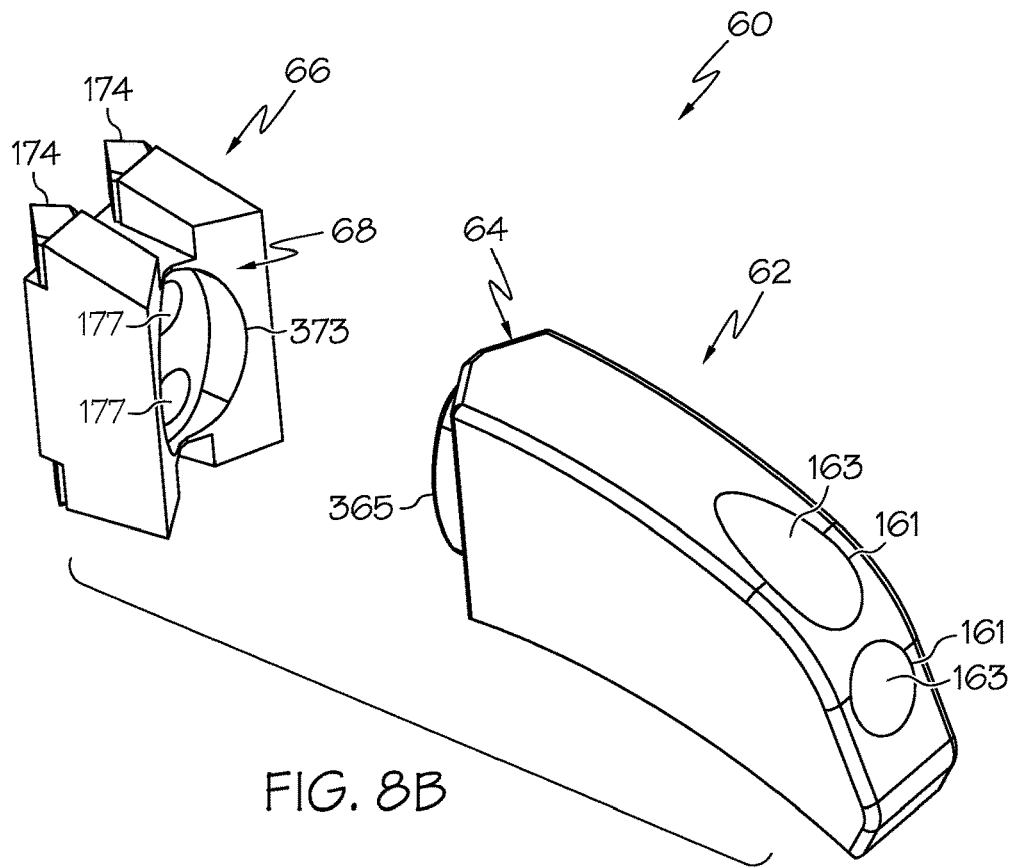
FIG. 8B is a rotated, exploded isometric view of the illustrative tool assembly of FIG. 8A according to one or more embodiments.

To couple (e.g., matingly couple) with the coupling mechanism of the tool holder 62, the land preparation tool 66 may comprise a coupling mechanism on its mounting surface 68 as shown in FIGS. 4A and 4B. In the embodiment of FIGS. 4A and 4B, the coupling mechanism of the land preparation tool 66 may comprises at least one round recess 73, which may receive the round peg 65 of the tool holder 62, thereby facilitating the mating of the land preparation tool 66 and the tool holder 62. While mating is the depicted coupling arrangement in the figures, other coupling mechanisms for the tool holder 62 and land preparation tool 66 are contemplated herein, for example, welding, adhering, magnetically coupling, or combinations thereof. Further as shown in FIGS. 7A and 7B, the land preparation tool 66 may comprise a pair of rounded recesses 273, which are configured to receive the rounded pegs 265 of the tool holder 62. In yet another embodiment as shown in FIGS. 8A and 8B, the coupling mechanism of the tool holder 62 may also comprise a raising bushing 365 (for example, a raised oval shaped bushing) comprising a pair of orifices therein. For coupling, the land preparation tool 66 comprises a rounded recess 373 (e.g., oval shaped) to correspond to the shape of the raised bushing 365 in order to receive the raised bushing 365 of the tool holder 62.

Moreover as shown in FIGS. 4A and 4B, the land preparation tool 66 may optionally comprise at least one channel 77 extending from the round recess 73 to an opening 79 disposed on the cutting surface 67 of the land preparation tool 66, which is disposed on a surface opposite the mounting surface 68 of the land preparation tool 66. When the tool holder 62 and land preparation tool 66 are coupled, the respective channels 63 and 77 of the tool holder 62 and land preparation tool 66 are aligned. Alternatively, the land preparation tool 66 may also comprise multiple channels such as the two channel 177 embodiment of FIGS. 7A and 7B. In a further embodiment, the channel 77 may be a threaded channel (not shown). The benefits of threaded channels in the tool holder 62 and land preparation tool 66 will be discussed in detail below.

Figure 11A:
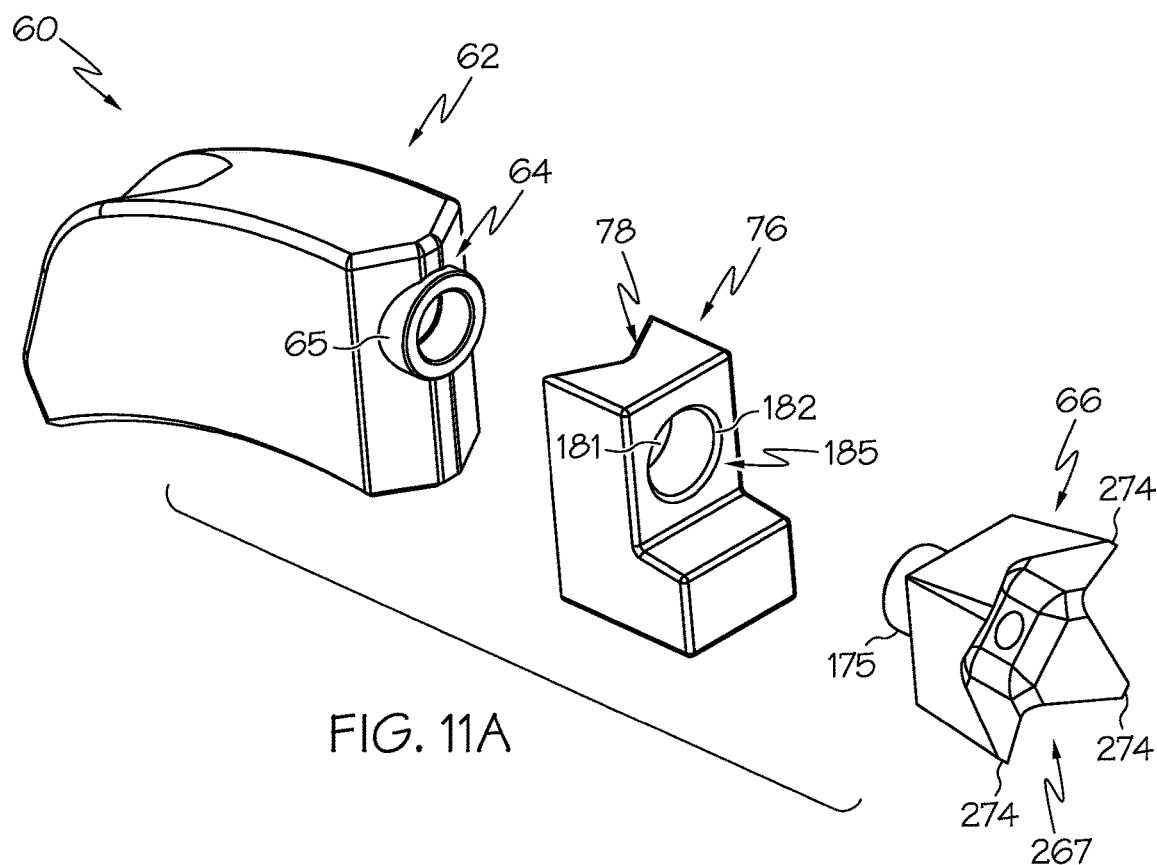
FIG. 11A is an exploded isometric view of an illustrative tool assembly comprising a tool holder, an intermediate connector, and a land preparation tool comprising a plurality of blades according to one or more embodiments.

As shown in FIGS. 4A and 4B, the cutting surface 67 may comprise at least one blade, or any other tooling component described above. For example, the cutting surface 67 may comprise twin side-by side blades 74 as shown in FIG. 4B. Alternatively as shown in FIGS. 7A and 7B, the cutting surface 167 may include two pairs of blades 174 disposed on opposite sides of the cutting surface 67. In yet another embodiment as shown in FIG. 11A, the cutting surface 267 may be a quad tooth cutting tool 274. Additional details regarding the cutting surface 67 embodiments of FIGS. 4A-6B and 12A-13B are provided below.

Figure 3B:
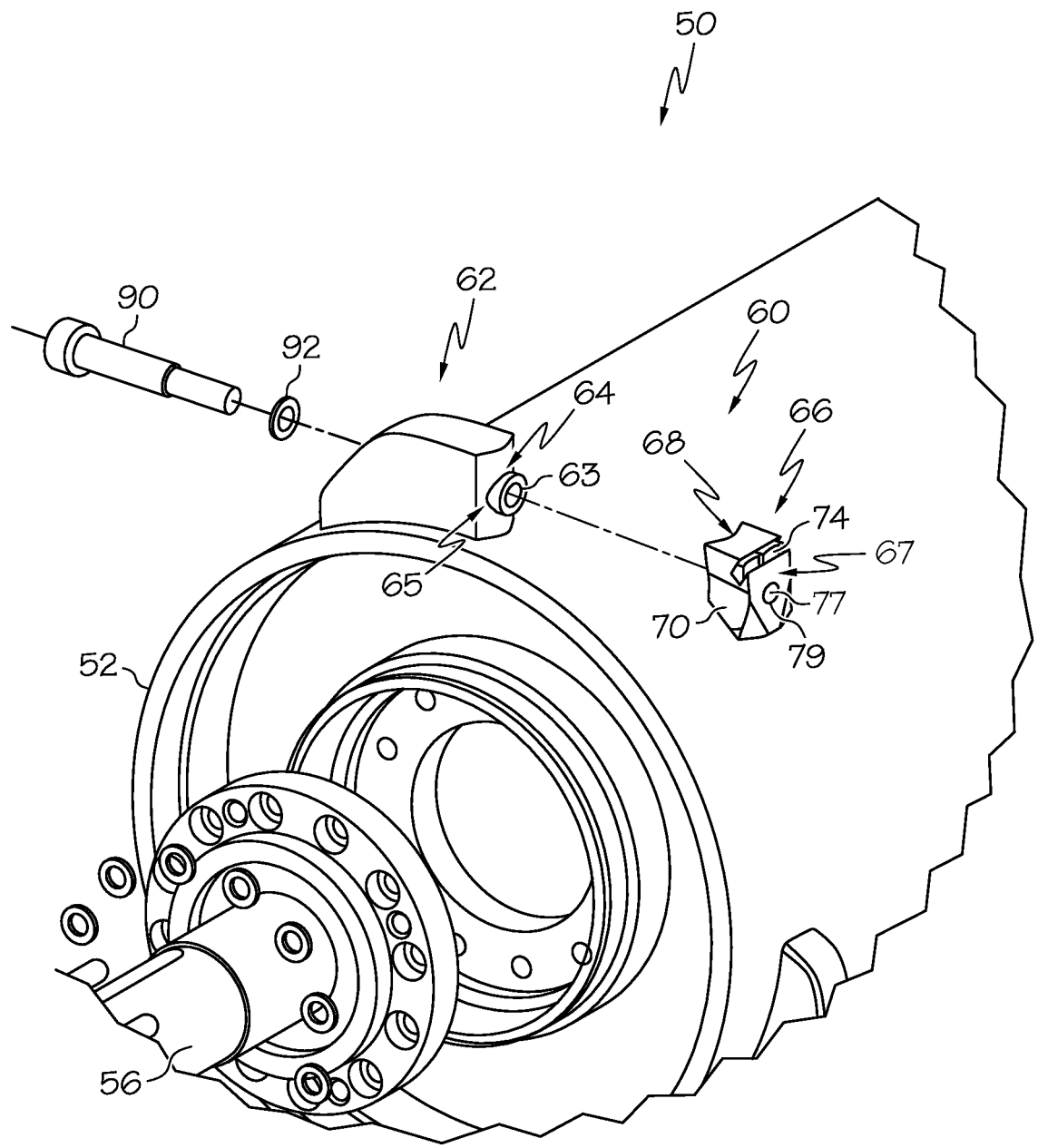
FIG. 3B is a cutaway exploded view of an illustrative rotatable tool showing the coupling arrangement of the illustrative tool assembly of FIG. 4A to the rotatable drum of FIG. 3A according to one or more embodiments.

Referring again to the embodiment of FIGS. 3B and 4A, the interference fit of inverse mounting surfaces 64 and 68 in combination with the insertion of rounded peg 65 into rounded recess 73 yields twofold male-female coupling between the tool holder 62 and the land preparation tool 66. To further ensure that the tool holder 62 and the land preparation tool 66 are secured to each other, an additional securing mechanism may also be provided. As shown in FIG. 3B, the rotatable tool 50 may utilize one or more securing bolts 90 extending through the land preparation tool 66, specifically through the tool holder channel 63 and the channel 77 of the land preparation tool 66. For the double channel illustrative embodiment of FIG. 7A, two securing bolts (not shown) may be used to secure the tool holder 62 to the land preparation tool 66.

As stated above, the respective channels of the land preparation tool 66 and the tool holder 62 may comprise internal threads. These internal threads may be used to engage external threads (not shown) of the securing bolts 90. As shown in FIG. 3B, a locking washer 92, locking pin or other suitable mechanism may be used to ensure the securing bolt(s) 90 is firmly secure within the channels of the land preparation tool 66, and the tool holder 62. For additional details regarding the bolt securing mechanism, U.S. Publication No. 2009/0014189 A1 is incorporated by reference herein in its entirety.

Referring again to FIG. 3B, the inverse mounting surfaces 64 and 68 of the tool holder 62 and land preparation tool 66, respectively, yield many unique advantages to the land preparation machine 10. For example, the V-shape non-planar profiles of inverse mounting surfaces 64 and 68 provides a locking advantage by ensuring that all forces are driven to the center of the tool holder. This increased contact area, along with the V-shaped profile reduces the opportunity for the bolting system to loosen during vibration and shock loading. The vertical direction of the V-shape profile allows for symmetrical tools that can be flipped to utilize a double-ended tool design. The locking advantage that the V-shape design provides greatly reduces the risk of the tool rotating or twisting the mounting joint with impacted compared to alternative designs.

Along with these advantages, the V-shaped tool profile allows for lower cost manufacturing. With the traditional mulching application, the mounting surfaces 64 and 68 of the tool holder 62 and the land preparation tool 66, respectively, require flat machined surfaces that must be perpendicular to the bolt axis. In contrast, the V-shaped profile is much more forgiving to surface finish and tolerances. The increase surface area along with the V-shape profile allows for manufacturing variations as well as the performance benefits provided by the larger supporting surface area.

Figure 9A:
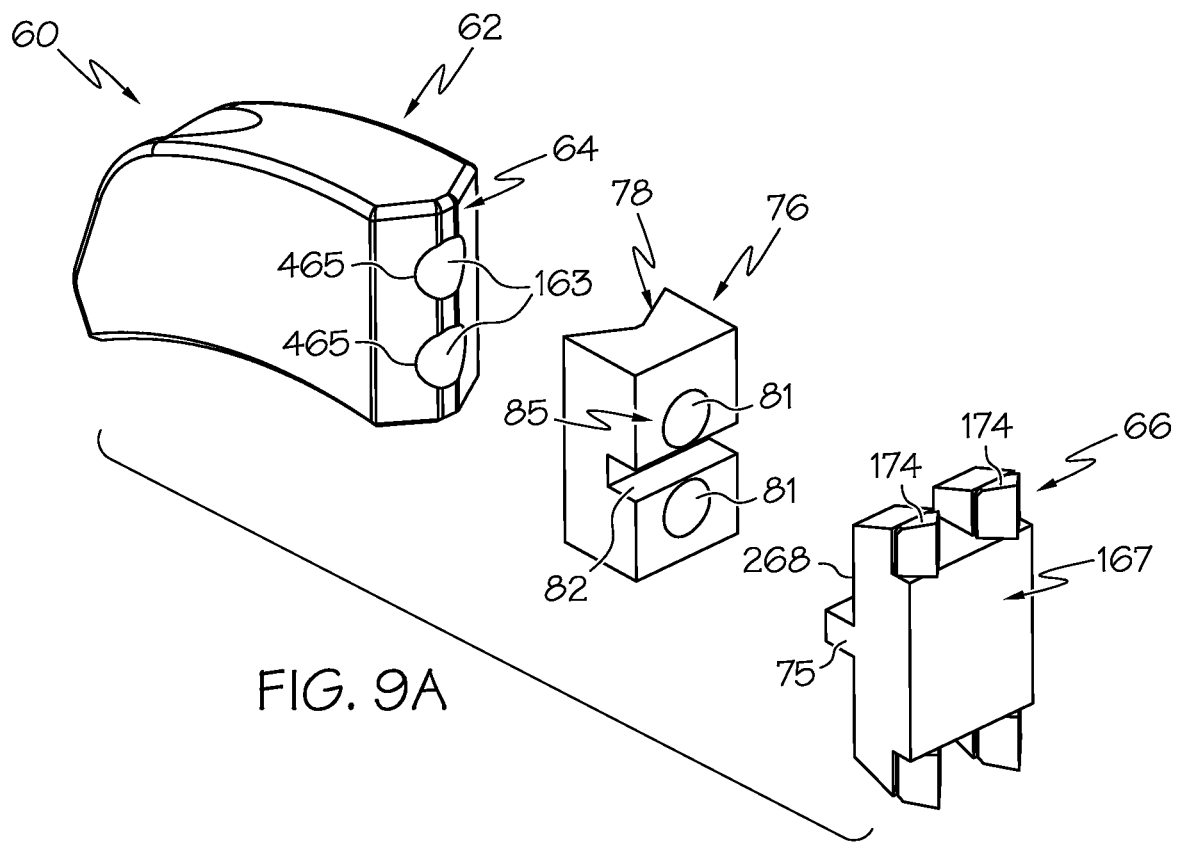
FIG. 9A is an exploded isometric view of an illustrative tool assembly comprising a tool holder, an intermediate connector, and a land preparation tool according to one or more embodiments.
Figure 9B:
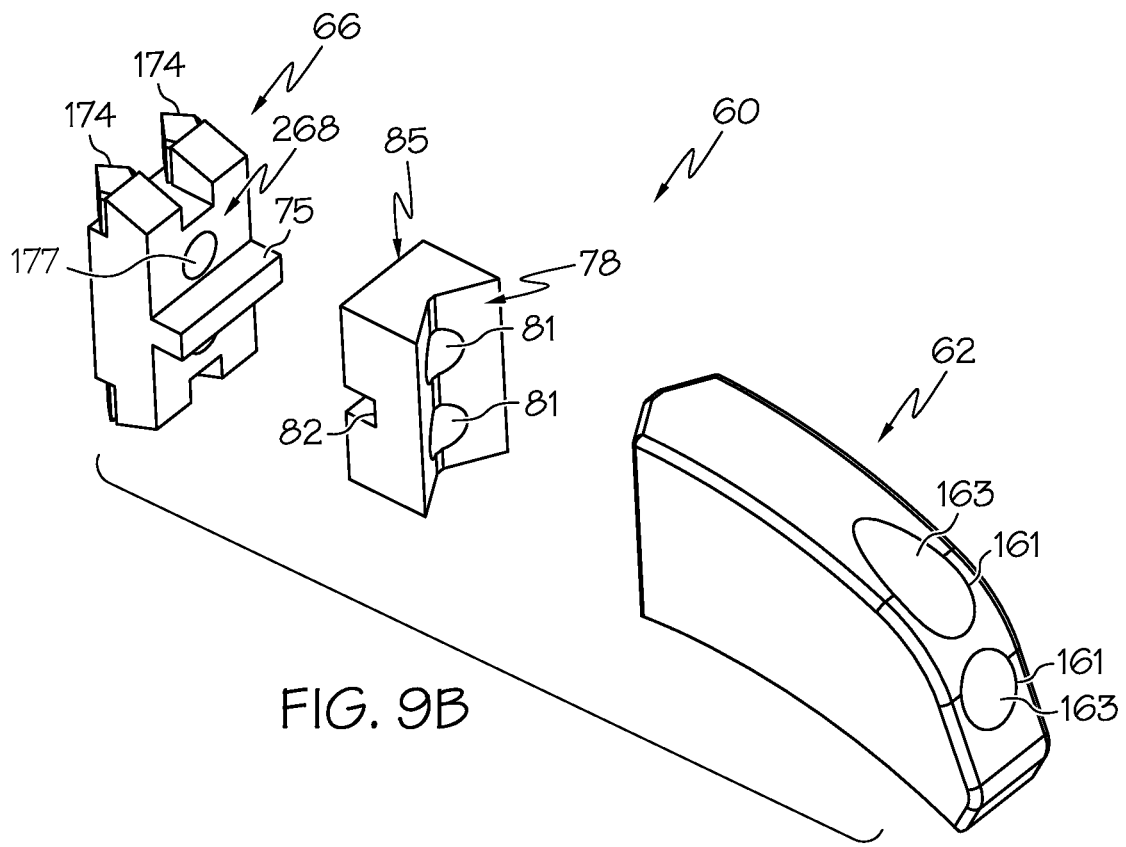
FIG. 9B is a rotated, exploded isometric view of the illustrative intermediate connector of FIG. 9A which shows the mounting surface of the illustrative land preparation tool according to one or more embodiments.

Referring to the embodiments of FIGS. 9A and 9B, the tool assemblies 60 may also comprise intermediate connectors disposed 76 between the tool holder 62 and the land preparation tool 66 and configured to couple the tool holder 62 and the land preparation tool 66. Due to wear and tear on the tool assemblies 60 from the rotation of the drum 52 and the mulching action performed, it has been found beneficial to have an intermediate connector 76, which may be easily removed and replaced. While various materials are suitable, it is contemplated that the intermediate connector 76 may comprise a different material than the land preparation tool 66 or the tool holder 62. The intermediate connector 76 may comprise carbide, mild steel, or other materials, such as metals, and durable organic and inorganic compositions as would be familiar to one of ordinary skill in the art. The intermediate connectors 76 may also have varying shapes and dimensions. In operation, the intermediate connector 76 is operable to join the land preparation tool 66 and the tool holder 62 by press fitting, slip fitting, etc.

While optional, the intermediate connector 76 provides numerous benefits to this land preparation apparatus 14. For example, the intermediate connector 76 protects against tool holder 62 wear, while acting as a structural support for tool positioning and lateral loading. The intermediate connector 76 may also improve fastening between the tool holder 62 and land preparation tool 66. As stated above, the intermediate connector 76 has a unique design and removability that enables it to be manufactured out of materials different from the tool holder 62 or land preparation tool 66. By altering the material properties of the intermediate connector 76 material, component wear can be controlled and an increased level of tolerance may be provided with minimal cost to the system.

Referring again to FIGS. 9A and 9B, the intermediate connector 76 may comprise a tool holder interface 78, which is a surface configured to be in flush contact with the mounting surface 64 of the tool holder 62, thereby forming a friction of interference fit. The tool holder interface 78 defines a non-planar profile inverse to the non-planar profile of the tool holder mounting surface 64. Like above, the non-planar profile defines any surface, which is not a straight planar surface. Illustrations of a non-planar profile may include V-shaped, concave, or convex profiles, or combinations thereof. As shown in FIGS. 9A and 9B, the tool holder interface 78 may comprise a V-shaped concave profile, which is an inverse shape of the V-shaped convex profile of the tool holder 62, and thereby facilitates mating of the tool holder interface 78 and the tool holder mounting surface 64.

Referring again to FIGS. 9A and 9B, the intermediate connector 76 also includes a tool interface 85 disposed on a surface of the intermediate connector 76 opposite the tool holder interface 78. The tool interface 85 may be configured to contact the mounting surface 268 of the land preparation tool 66. Although FIGS. 9A and 9B depict the mounting surface 268 as a flat planar profile, it is contemplated that the mounting surface 268 could include a non-planar profile, such as the V-shaped profile or the other non-planar profiles described in detail above. It is further contemplated that the tool interface 85 and the tool mounting surface 268 may define inverse surfaces, configured to form an interference fit.

Figure 10A:
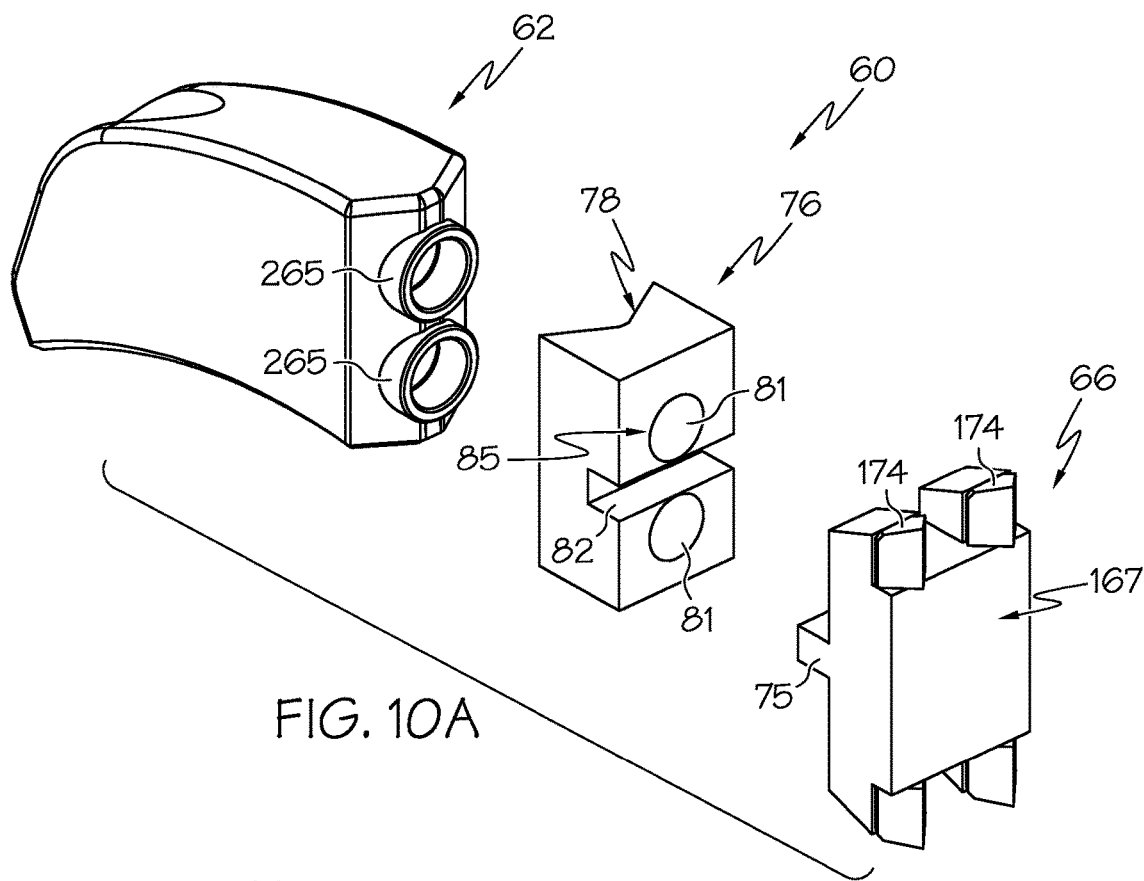
FIG. 10A is an exploded isometric view of an illustrative tool assembly comprising a tool holder, an intermediate connector, and a land preparation tool according to one or more embodiments.
Figure 10B:
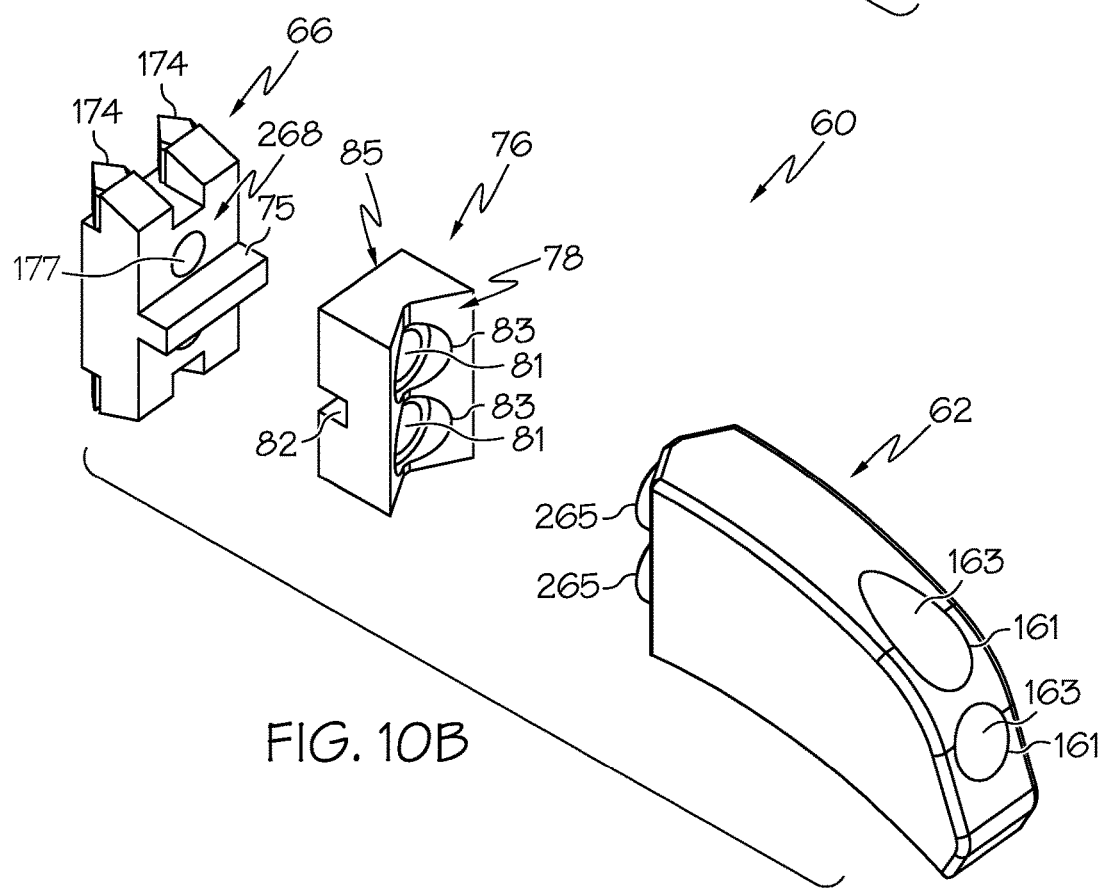
FIG. 10B is a rotated, exploded isometric view of the illustrative intermediate connector of FIG. 10A which shows the mounting surface of the illustrative land preparation tool according to one or more embodiments.

To provide additional securing of tool assembly 60 components, additional coupling components may be utilized. Referring to FIGS. 10A and 10B, the tool holder interface 78 may comprise a coupling mechanism configured to matingly connect with a coupling mechanism (e.g., a pair of rounded pegs 265 as in FIG. 10A) of the tool holder 62. In the embodiment of FIGS. 10A and 10B, the coupling mechanism of the tool holder interface 78 may comprise two round recesses 83 operable to matingly receive the rounded pegs 265 of the tool holder 62. In the alternative embodiment of FIGS. 11A and 11B, the coupling mechanism of the tool holder interface 78 may comprise one round recess 183 operable to matingly receive a rounded peg 65 of the tool holder 62. The reverse configuration wherein the tool holder interface 78 comprises at least one round peg and the tool holder mounting surface 64 comprises at least one rounded recess is further contemplated herein.

Figure 11B:
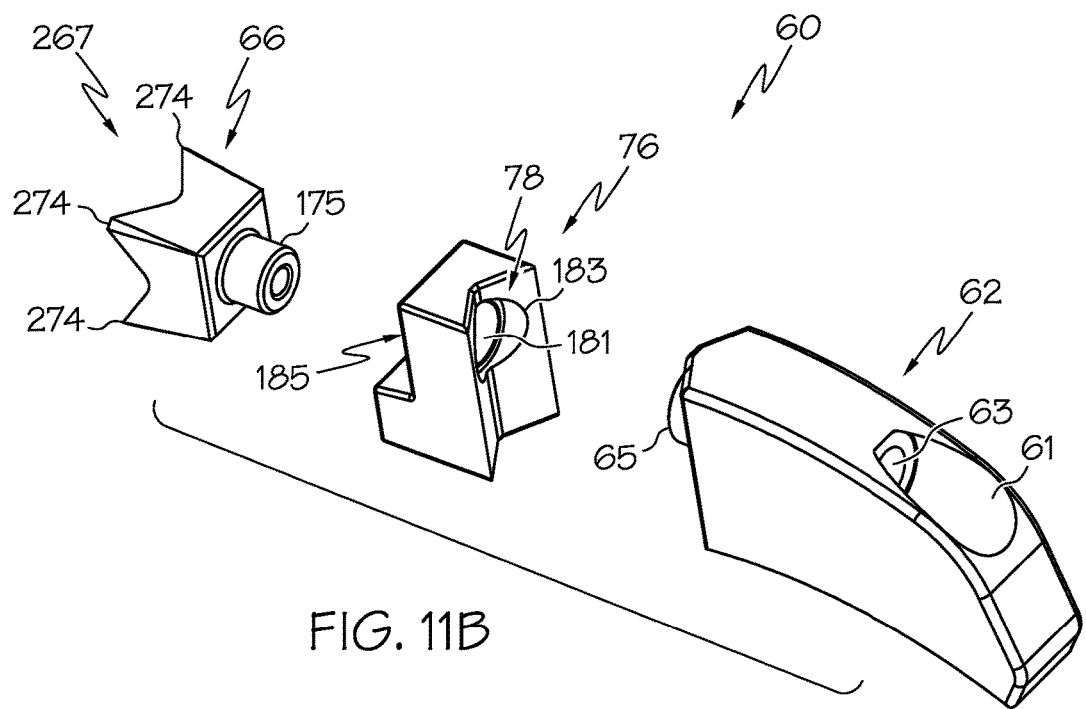
FIG. 11B is a rotated, exploded isometric view of the illustrative intermediate connector of FIG. 11A which shows the mounting surface of the illustrative land preparation tool according to one or more embodiments.
Figure 12A:
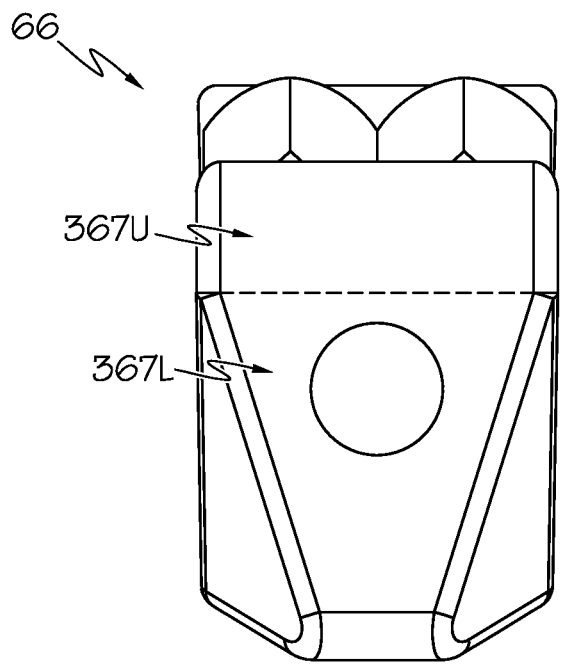
FIG. 12A is a front view of an illustrative land preparation tool comprising a cutting surface with an outwardly extending lower region according to one or more embodiments.
Figure 12B:
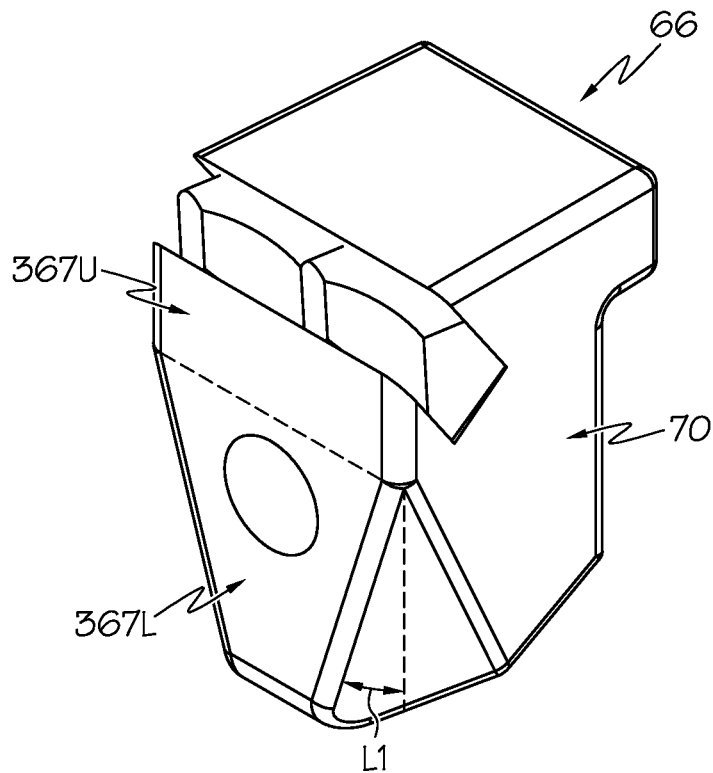
FIG. 12B is a isometric view of the illustrative land preparation tool of FIG. 12A according to one or more embodiments.

Moreover, each tool interface 85 may comprise a coupling mechanism operable to matingly connect with a coupling mechanism of the land preparation tool 66. As shown in the embodiment of FIGS. 10A and 10B, the coupling mechanism of the tool interface 85 may comprise at least one rectangular recess 82 and the coupling mechanism of the land preparation tool 66 comprises at least one rectangular peg 75 matingly inserted into the rectangular recess 82 of the tool interface 85. In an alternative embodiment as shown in FIGS. 11A and 11B, the coupling mechanism of the tool interface 85 may comprise one round recess 182 operable to matingly receive a rounded peg 175 of the land preparation tool 66. Although the figures only depict one rectangular or round peg and one corresponding rectangular recess or rounded recess, respectively, it is contemplated that the mating arrangement may include more than one peg/recess or a combination of rectangular and round peg/recesses. Like above, the reverse configuration wherein the tool interface 85 comprises at least one rectangular peg and the tool holder comprises at least one rectangular recess is further contemplated herein.

As described above, the attachment of the tool holder 62 to the land preparation tool 66 may further include an additional securing mechanism, for example, via bolts 90 as shown in FIG. 3B. Similarly, the additional securing mechanism may also be incorporated into the tool assemblies 60 which include am intermediate connector 76, for example, the tool assembly 60 embodiments of FIGS. 9A-11B. As shown in FIG. 9A, the intermediate connector 76 may comprise at least one channel 81 extending from the tool holder interface 78 to the tool interface 85, wherein the channels 81 are configured to align with the channels 161 of the tool holder 62 and the channels 177 of the land preparation tool 66. Similar to the bolting arrangement of FIG. 3B, the bolt(s) 90 would be secured through the aligned channels of the tool holder 62, the intermediate connector 76, and the land preparation tool 66. In contrast to the double channel 81 embodiments of FIGS. 9A-10B, it is further contemplated that single channels 181 may also be used, as shown in FIGS. 11A and 11B. Further similar to the bolting arrangement of FIG. 3B, the channels 81 or 181 may include internal threads (not shown) to engage the external threads (not shown) of the bolt 90.

When assembling the land preparation apparatus 14 as shown in FIGS. 3A and 3B, the tool holder 62 is mounted to a drum 52 by a suitable mounting mechanism, for example, through a bolt, screw, or weld. To couple the land preparation tool 66 to the tool holder 62, the inverse mounting surfaces 64 and 68 contact one another, thereby forming an interference or friction fit. Additionally, the round peg 65 of the tool holder 62 may be matingly inserted into the recessed region 73 of the land preparation tool 66 to additionally secure the tool assembly 60. Moreover, bolt(s) 90 may be inserted through the channels of the tool holder 62, and land preparation tool 66 to further secure the tool assembly 60.

Alternatively, as shown in the embodiment of FIGS. 10A and 10B, the intermediate connector 76 may be utilized in the tool assembly 60 when assembling the land preparation apparatus 14. First, the tool holder interface 78 of the intermediate connector 76 and the mounting surface 64 of the tool holder 62, which define inverse non-planar surface profiles, contact one another, thereby forming an interference or friction fit. Further as shown in the embodiment of FIG. 10A, the rounded pegs 165 of the tool holder 62 may be matingly inserted into the rounded recesses 83 of the intermediate connector 76. Then, the rectangular peg 75 of the land preparation tool 66 may be matingly inserted into the recessed region 82 of the intermediate connector 76. At which point, the intermediate connector 76 resides within the land preparation tool 66 and the tool holder 62. Additionally, a bolt(s) 90 may be inserted through the channels of the tool holder 62, the intermediate connector 76, and the land preparation tool 66 to further secure the tool assembly 60.

Figure 13A:
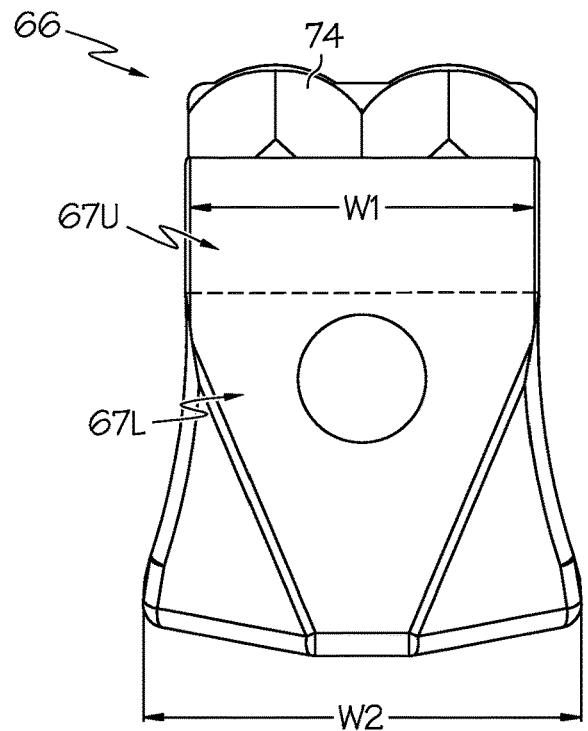
FIG. 13A is a front view of another illustrative land preparation tool comprising a cutting surface with an outwardly extending lower region and side surfaces with outwardly extending lower regions according to one or more embodiments.
Figure 13B:
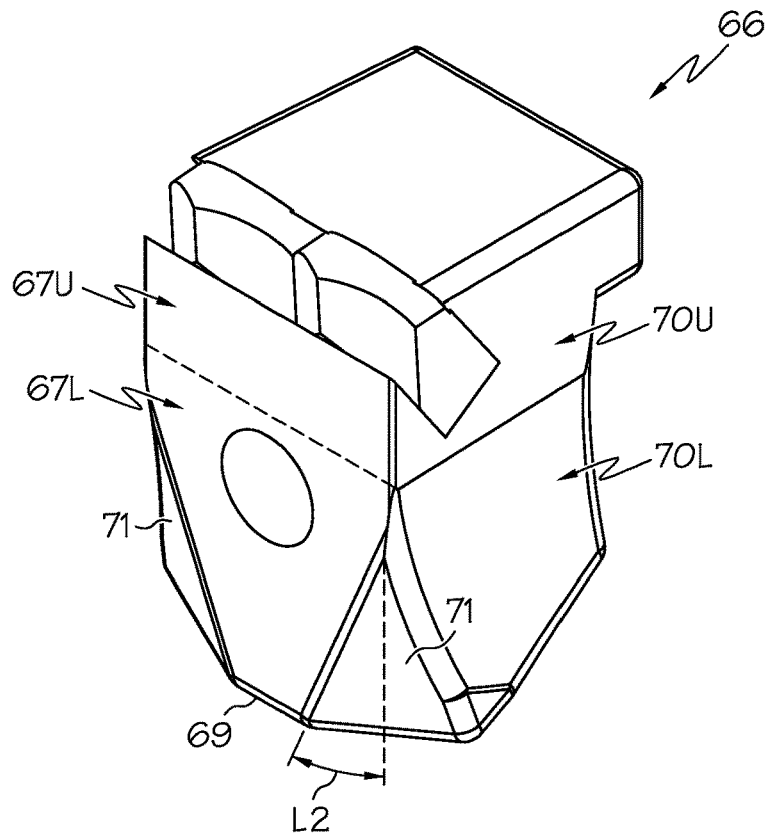
FIG. 13B is a isometric view of the illustrative land preparation tool of FIG. 13A according to one or more embodiments.

In addition to the improved coupling of the components of the tool assembly 60, other embodiments are directed to improvements in the land preparation tool 66, specifically with regard to the cutting surface 67 disposed on a surface opposite the mounting surface 68 of the land preparation tool 66. As shown in FIGS. 13A and 13B, the cutting surface 67 (as shown in FIGS. 4A-6B) may define an upper region 67U and a lower region 67L. The lower region 67L defines a non-planar profile extending outwardly from a plane defined by the upper region 67U. The non-planar lower region 67L of the cutting surface may inwardly taper from a pair of opposite edges toward a midpoint of the cutting surface, or outwardly taper from a pair of opposite edges toward a midpoint of the cutting surface. Additionally, the non-planar profile may be a V-shaped outwardly extending profile as shown in FIGS. 12A-13B, a convex profile, a concave profile, a trapezoidal profile or another suitable profile familiar to one of ordinary skill in the art. Due to this non-planar profile, the lower region 67L may define a non-planar profile extending outwardly a distance L2 from a plane defined by the upper region 67U as shown in FIGS. 13A and 13B. Moreover, the lower region 67L may extend widthwise (W2) a horizontal distance which is greater than the width (W1) of the upper region 67U. Moreover, as shown in FIGS. 13A and 13B, the land preparation tool 66 may comprise a pair of side surfaces 70 extending between the mounting surface 68 and the cutting surface 67, wherein the side surfaces 70 comprise an upper region 70U and a lower region 70L. In conjunction with the lower region 67L of the cutting surface, the lower region 70L may also extend widthwise a horizontal distance greater than the width (W1) of the upper region 67U of the cutting surface. As shown in an alternative embodiment on FIGS. 12A and 12B, the non-planar lower region 367L may define a non-planar profile extending outwardly a distance L1 from a plane defined by the upper region 367U; however, the lower region 367L does not extend widthwise a horizontal distance, which is greater than the width of the upper region 67U.

An illustrative embodiment of a land preparation tool 66 is shown in FIGS. 14A-14I and 14K-14L. Although not shown in FIGS. 14A-14I and 14K-14L, the land preparation tool 66 shown can form a part of and be connected to a tool assembly 60 by a tool holder 62, and optionally, an intermediate connector 76, as discussed above. The tool assembly 60 can be connected to a rotary drum 52, as depicted in FIG. 3B. In an illustrative embodiment, the land preparation tool 66 can be considered symmetric about two imaginary planes, a first plane such as, for example, a horizontal plane HP and a second plane such as, for example, a vertical plane VP, which can intersect at a line defining a longitudinal axis A1. In the embodiment shown, longitudinal axis A1 is also the central axis of the tool 66. The longitudinal axis A1 can correspond to the bolt axis described above, particularly with respect to FIG. 3B. As used herein, the terms "vertical" and "horizontal" are used with respect to the orientation of FIGS. 14A-14I and 14K-14L, and relate to an in-use configuration of the land preparation tool 66.

The land preparation tool 66 can comprise a cutting portion 467 including a non-planar, concave inner surface 467A and a tapered cylindrical outer surface 467B. The concave inner surface 467A may concavely extend (e.g., substantially outwardly) from a proximal midpoint of the cutting portion 467 to a distal edge comprising a circular blade 474. The proximal midpoint can coincide with the axis A1, which can be longitudinally centrally located in a channel 477 (e.g., the central axis). Additionally, the concave inner surface 467A may have a non-planar profile, such as a bell-shaped profile or another suitable profile familiar to one of ordinary skill in the art. The concave inner surface 467A may be generally hemispherical-shaped and include the generally circular cutting blade 474, which can be a relatively sharp edge at the extremity of the hemispherical-shaped inner surface 467A. The concave inner surface 467A need not be precisely hemispherical, but can have a surface profile generally described as bowl-shaped, oval bowl-shaped, oblong concave shaped, and the like, for example. The tapered cylindrical outer surface 467B can be a generally smooth, frustroconical shape tapering from a first, maximum diameter D1 to a second, minimum diameter D2, as indicated in FIG. 14E.

Circular blade 474 can be a tapered distal edge of the cutting portion 467. The tapered distal edge of the circular blade 474 can be a blade-like edge. In the illustrated embodiment, the circular blade 474 is disposed generally circularly, as discussed above, and allows for the land preparation tool 66 to be rotated to utilize virtually all portions of the blade for longer tool life. That is, as one portion of the circular blade 474 wears during use, the land preparation tool 66 can be removed, rotated about axis A1, reinstalled, and another portion of the circular blade 474 can be used or receive the bulk of wear due to usage.

As shown in FIGS. 14A-14I and 14K-14L, the land preparation tool 66 may comprise a generally cylinder-like side surface 470 extending from a distal edge 467C of the tapered cylindrical outer surface 467B to a mounting interface 468. The side surface 470 can be generally frustroconical in shape tapering from the first maximum diameter D1 to a third minimum diameter D3, as illustratively shown in FIG. 14E.

In general, the dimensions D1, D2, and D3 can be independently determined according to desired design. That is, in an embodiment, D2 can be greater than D1 and D3 can be greater than D1. As well, D1 can be greater than or equal to D2 or D3; D2 can be greater than or equal to D1 or D3; and, D3 can be greater than or equal to D1 or D2.

The mounting interface 468 is configured to interface with a tool holder mounting surface of a tool holder, e.g., the tool holder mounting surface 64 or the tool holder mounting surface 164 of the tool holder 62, or any other suitably configured mounting surface of a tool holder. As shown in the illustrative embodiment of FIGS. 14A-14I and 14K-14L, the mounting interface 468 of the land preparation tool 66 may define a symmetrical, multi-faceted surface, at least a portion of which may be the inverse of the configuration of the tool holder mounting surface 64 (not shown). In the illustrative embodiment, the mounting interface 468 includes a plurality of rear surfaces 468A and a plurality of bevel surfaces 468B extending inwardly from, or toward, the side surface 470. Each of the rear surfaces 468A can be on the same plane, which may be normal to the axis A1 of the channel 477. The bevel surfaces 468B each extend inwardly from the rear surfaces 468A toward the channel 477. As a result of the inverse non-planar profiles of the tool holder mounting surface 64 and the mounting interface 468 of the land preparation tool 66, flush contact or substantially flush contact may be achieved between the tool holder mounting surface 64 and at least a portion of the mounting interface 468 when the tool holder 62 and land preparation tool 66 are connected. This yields an interference fit or a friction fit between at least a portion of the mounting interface 468 and tool holder mounting surface 64.

The channel 477 can extend into the land preparation tool 66 from an opening 478 disposed the mounting interface 468 to facilitate access for a mounting or securing bolt (not shown). In some embodiments, such as the one illustratively shown in FIG. 14H, the channel 477 can extend from the opening 478 disposed on the mounting interface 468 to an opening 479 disposed on the concave inner surface 467A of the cutting portion 467. In alternative embodiments of the land preparation tool 66, such as the one illustratively shown in FIG. 14J, the channel 477 may extend only partially into the body of the land preparation tool 66 from the opening 478. For example, in such embodiments, the channel 477 may be a blind bore having internal threads to which a mounting bolt can be threaded.

Figure 14A:
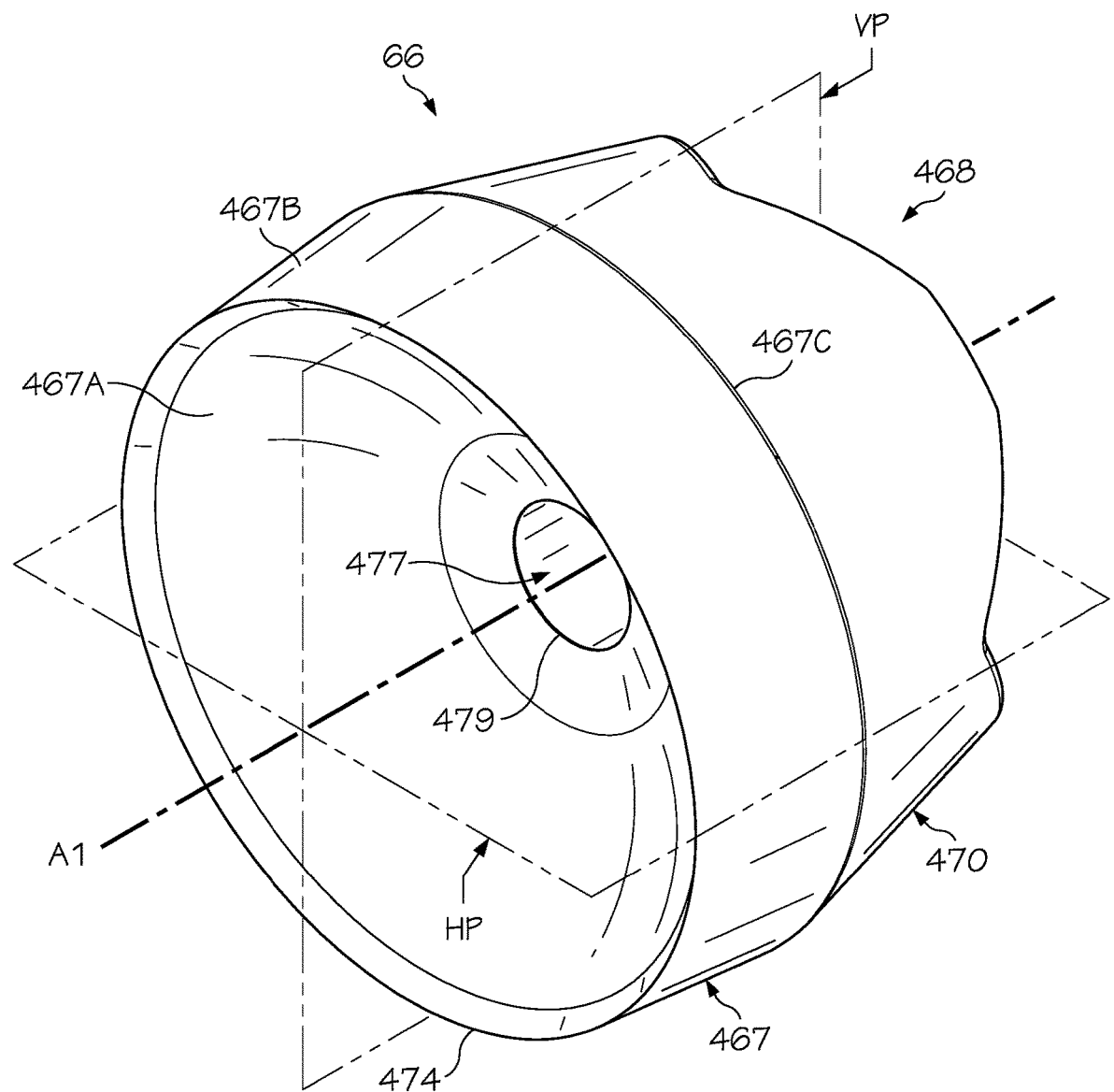
FIG. 14A is a front isometric view of an illustrative land preparation tool according to one or more embodiments.
Figure 14B:
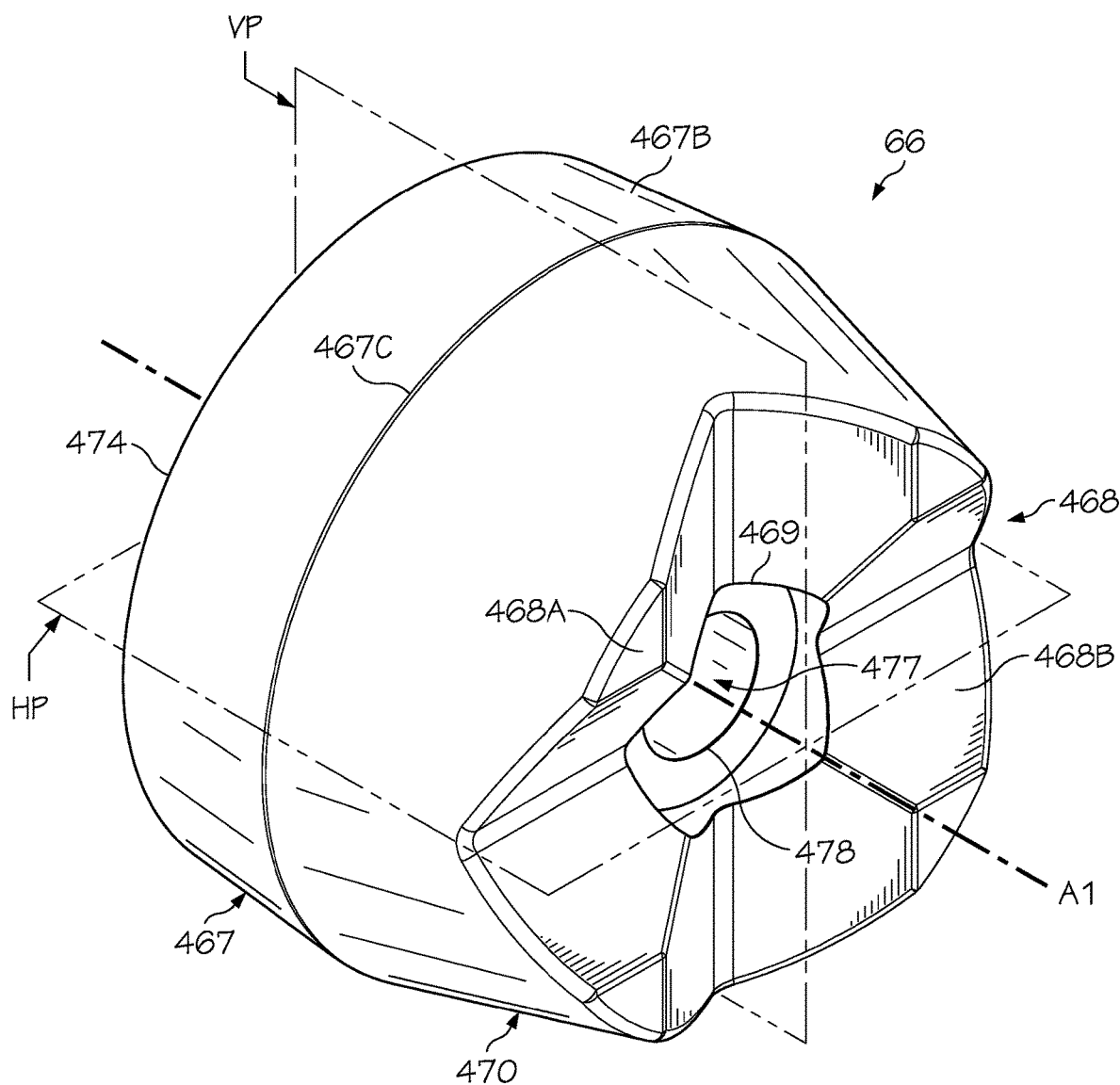
FIG. 14B is a rear isometric view of the illustrative land preparation tool of FIG. 14A according to one or more embodiments.
Figure 14C:
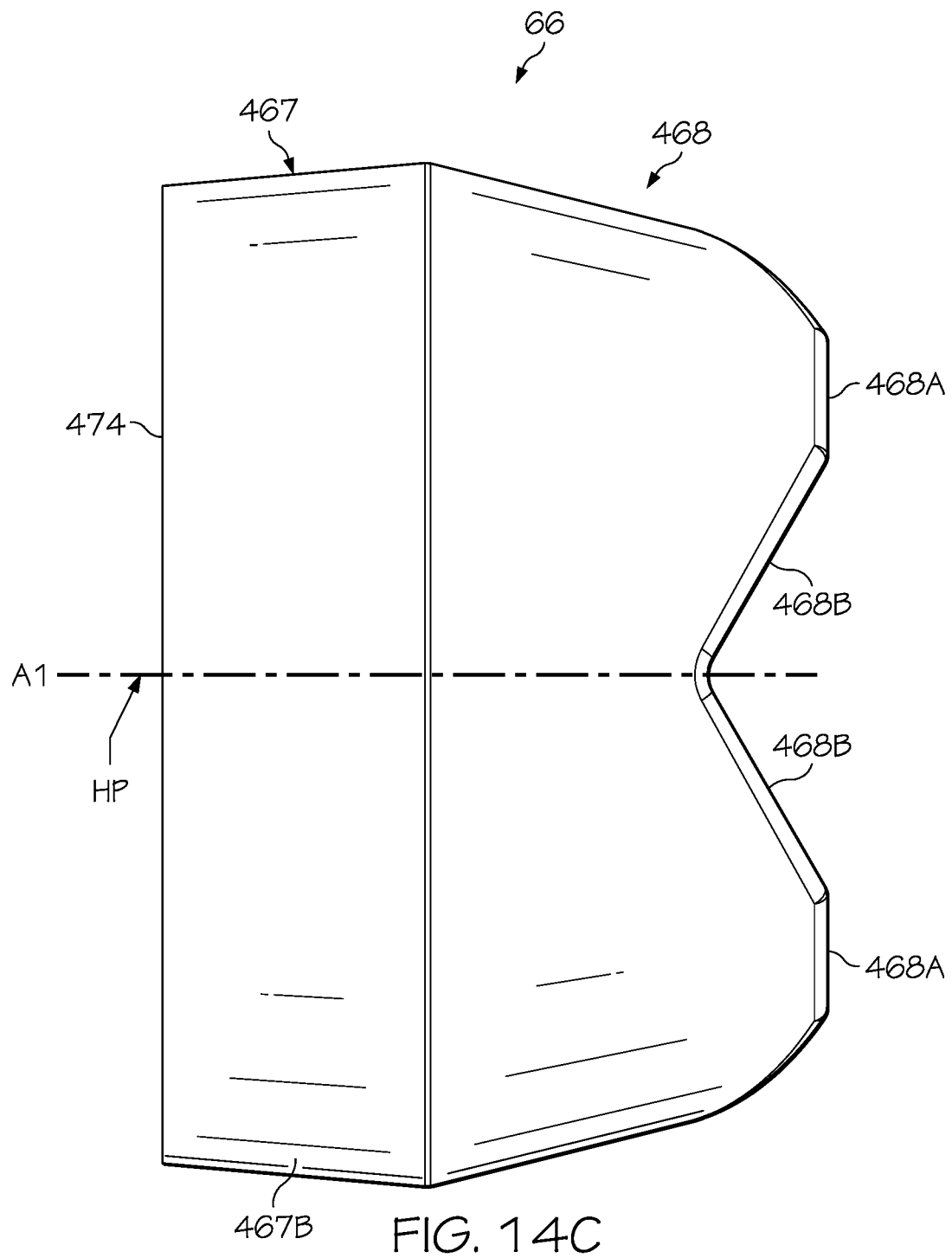
FIG. 14C is a right side view of the illustrative land preparation tool of FIG. 14A according to one or more embodiments.
Figure 14D:
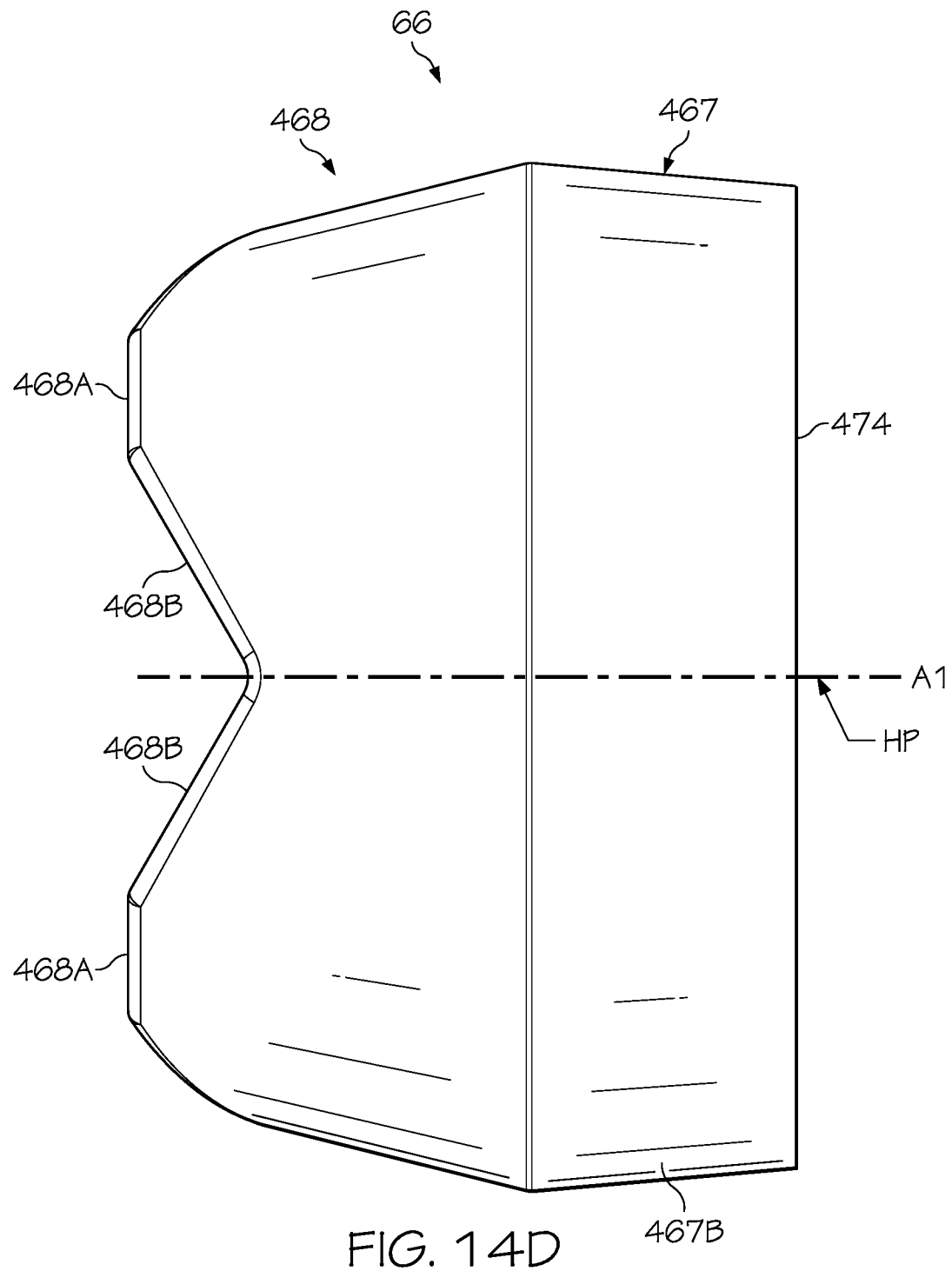
FIG. 14D is a left side view of the illustrative land preparation tool of FIG. 14A according to one or more embodiments.
Figure 14E:
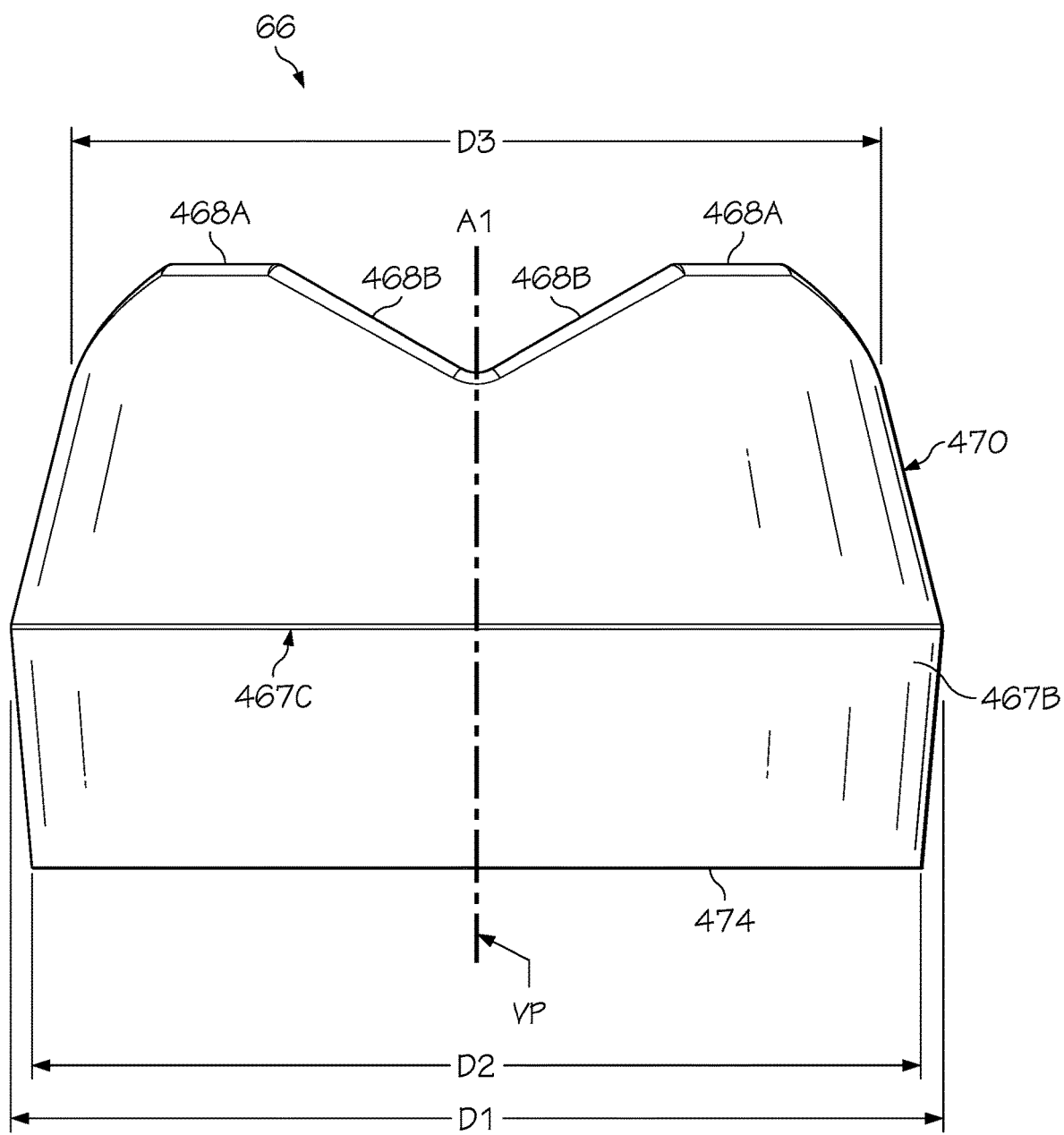
FIG. 14E is a top view of the illustrative land preparation tool of FIG. 14A according to one or more embodiments.
Figure 14F:
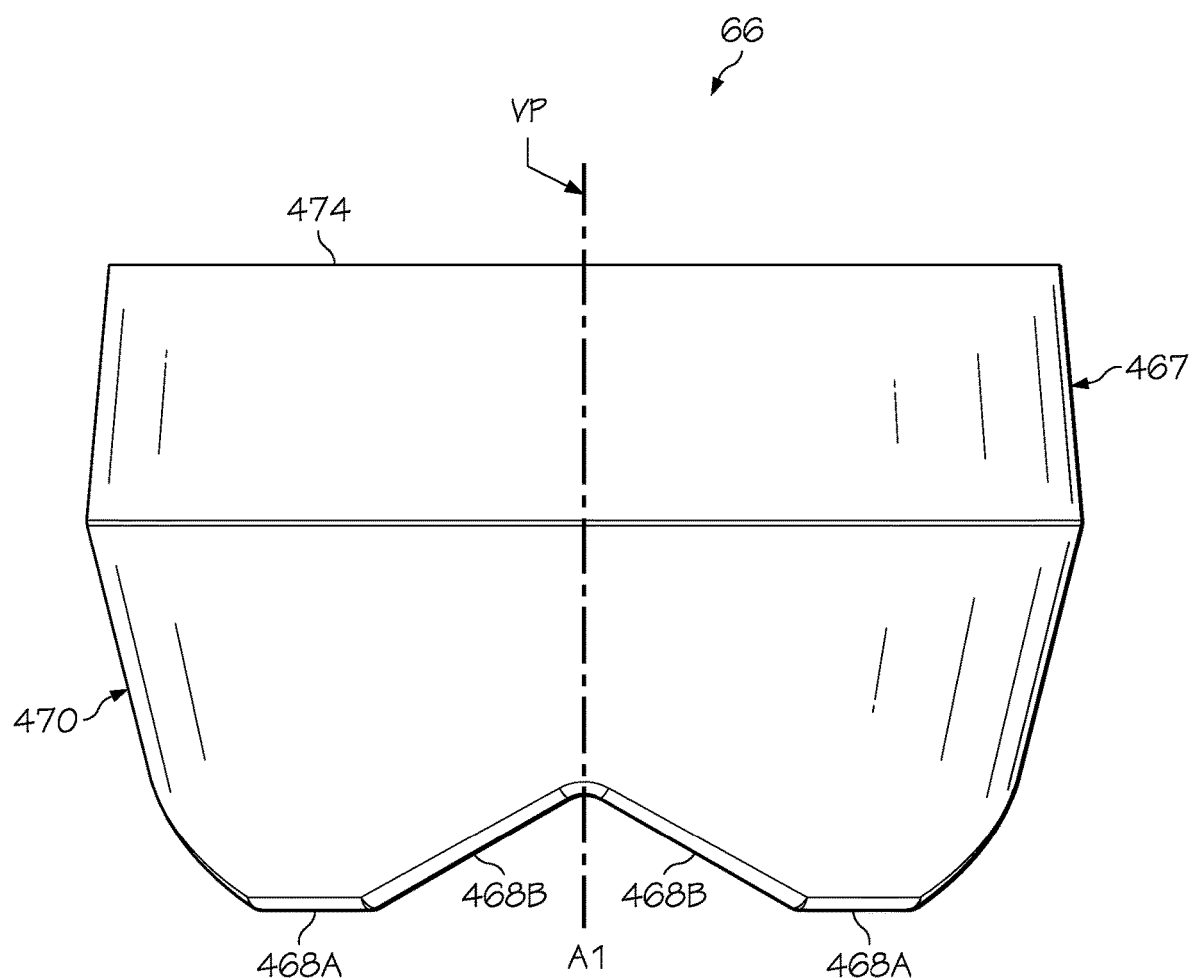
FIG. 14F is a bottom view of the illustrative land preparation tool of FIG. 14A according to one or more embodiments.
Figure 14G:
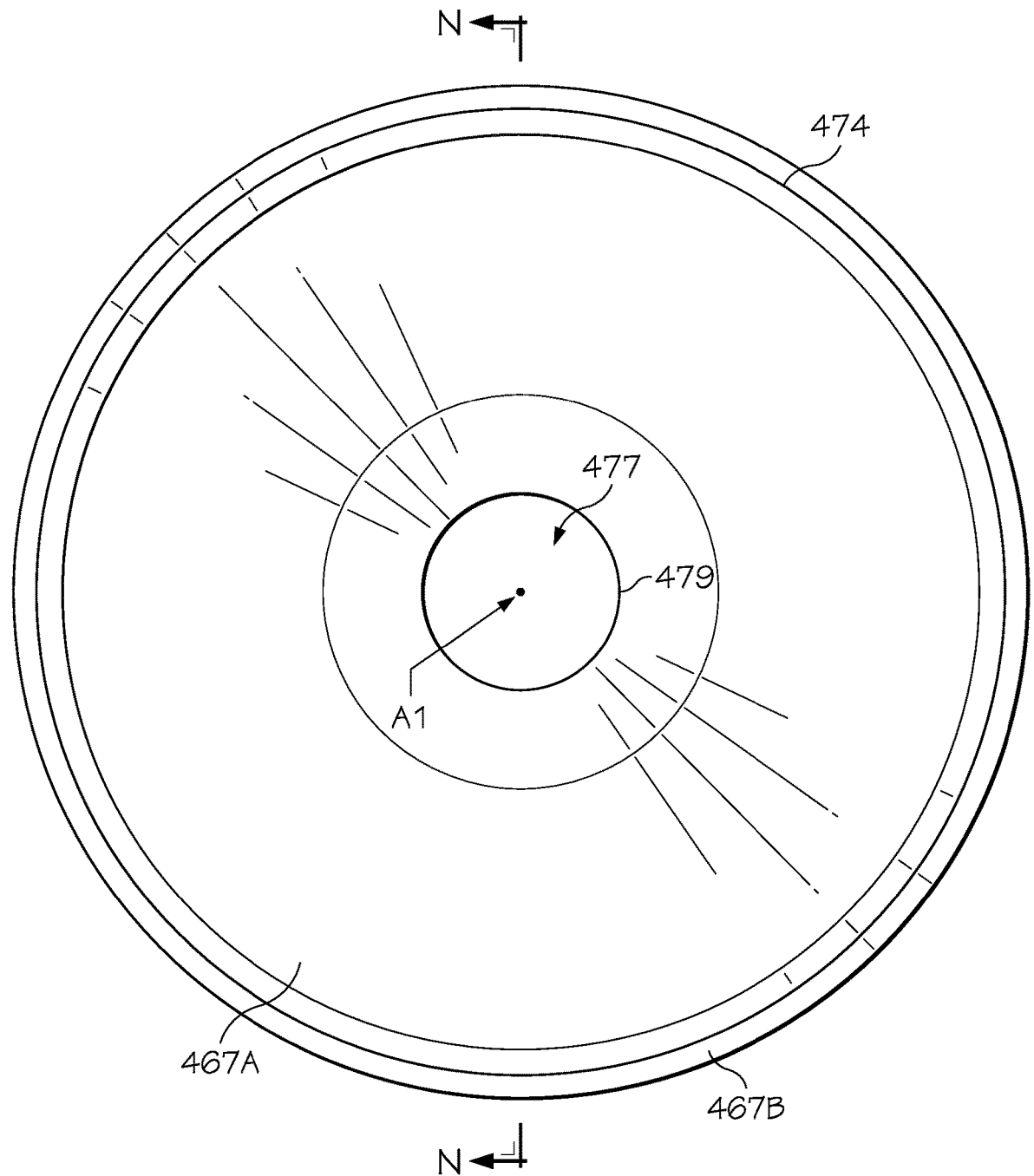
FIG. 14G is a front view of the illustrative land preparation tool of FIG. 14A according to one or more embodiments.

In an embodiment, the bevel surfaces 468B can comprise two pairs of opposing V-shaped surfaces, with an apex of the first pair of V-shaped surfaces being disposed in a first plane (e.g., the horizontal plane HP, as indicated in FIGS. 14B-14C), and an apex of a second pair of V-shaped surfaces being disposed in a second plane (e.g., the vertical plane VP, as indicated in FIGS. 14B and 14E). As can be understood, the paired, V-shaped, bevel surfaces 468B of the illustrated embodiment, where the apexes of the paired V-shaped surfaces are orthogonal to one another, allow for the land preparation tool 66 to be mounted in at least four different positions when connected to a tool assembly 60 by a tool holder 62, and optionally, an intermediate connector 76, as discussed above. Thus, the land preparation tool 66 can be rotated among the four positions to utilize the full circular extent of the circular blade 474 of the cutting portion 467. In an embodiment, the apex of the first pair of V-shaped surfaces and the apex of the second pair of V-shaped surfaces can be disposed in a plane normal to the longitudinal axis and intersect at the longitudinal axis.

The plurality of rear surfaces 468A can comprise four discrete rear surfaces disposed distally from the apex of the first pair of V-shaped surfaces and the apex of the second pair of V-shaped surfaces. However, in general, the mounting interface 468 of the land preparation tool 66 can be a multi-faceted surface comprising "n" bevel surfaces 468B, where "n" is an integer between 2 and 100. As shown in FIGS. 14K and 14L, each bevel surface 468B can be substantially planar and occupy a portion of a "pie shaped" segment 482 of the mounting interface 468. In the non-limiting illustrative embodiment shown in FIGS. 14K and 14L, eight segments 482 each comprise a single bevel surface 468B. Each bevel surface 468B can be inclined such that a portion of a first edge 484 can be at a first distance from, for example, circular blade 474, and a portion of second edge 486 can be a second distance from the circular blade 474, wherein the first and second distances are measured parallel to the axis A1, and wherein the second distance can vary but is always greater than the first distance. Further, as discussed above, each bevel surface 468B may be the inverse of a like surface of the tool holder mounting surface 64 (not shown). In an illustrative embodiment, the mounting interface 468 may or may not include rear surfaces 468A and discussed above.

Figure 14H:
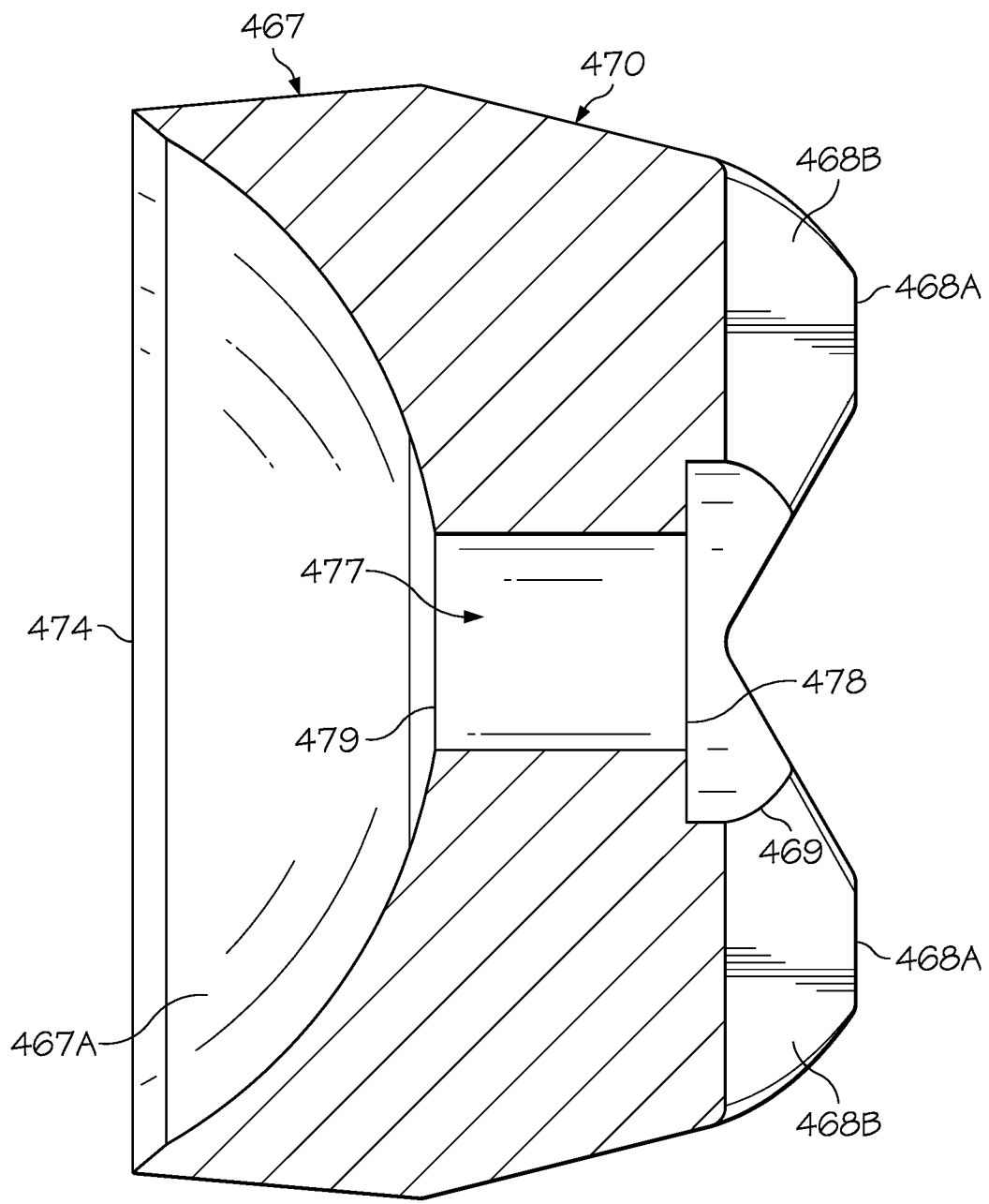
FIG. 14H is a cross sectional view of the illustrative land preparation tool of FIG. 14A, taken along line N-N.
Figure 14I:
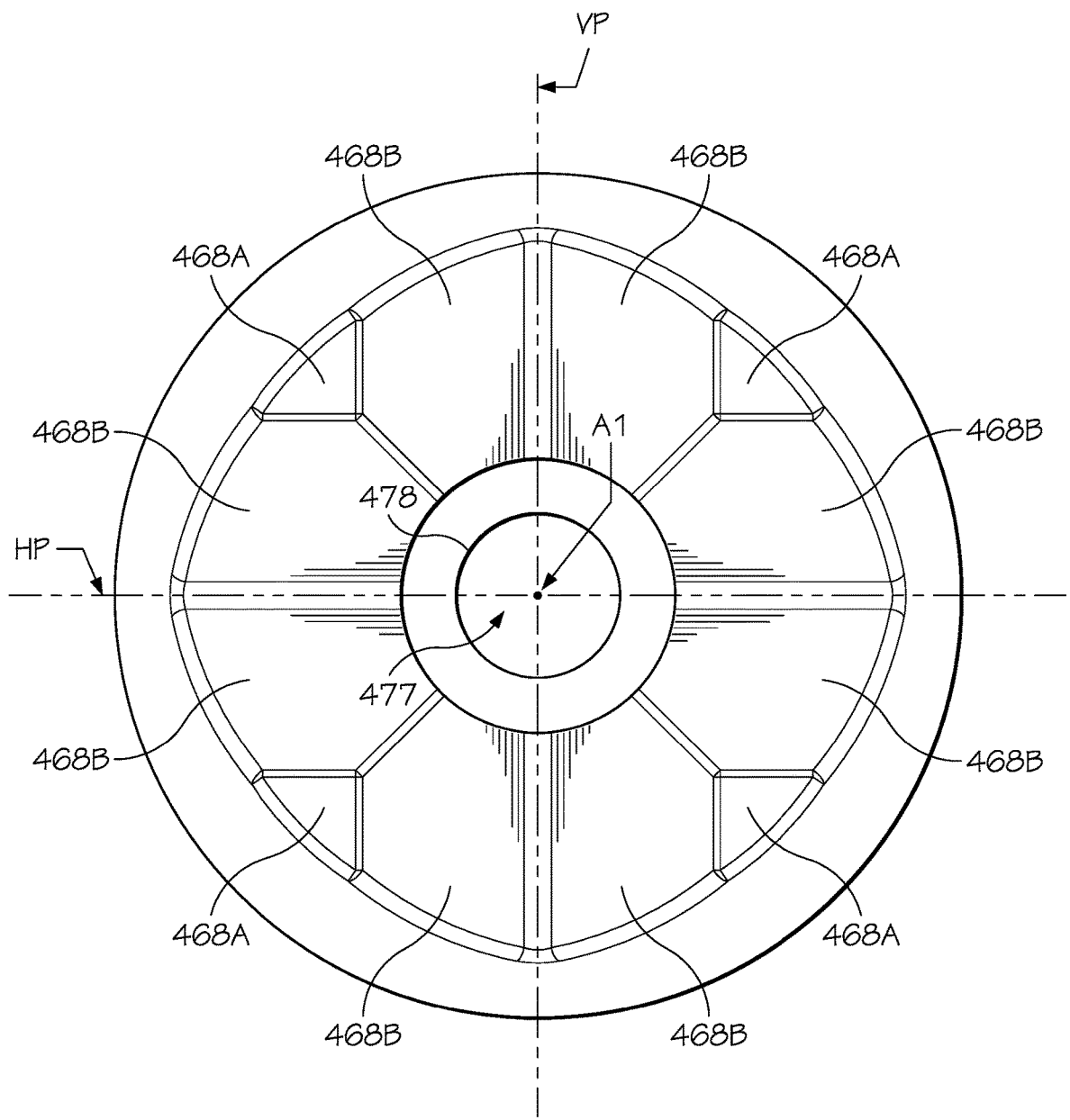
FIG. 14I is a back view of the illustrative land preparation tool of FIG. 14A according to one or more embodiments.
Figure 14J:
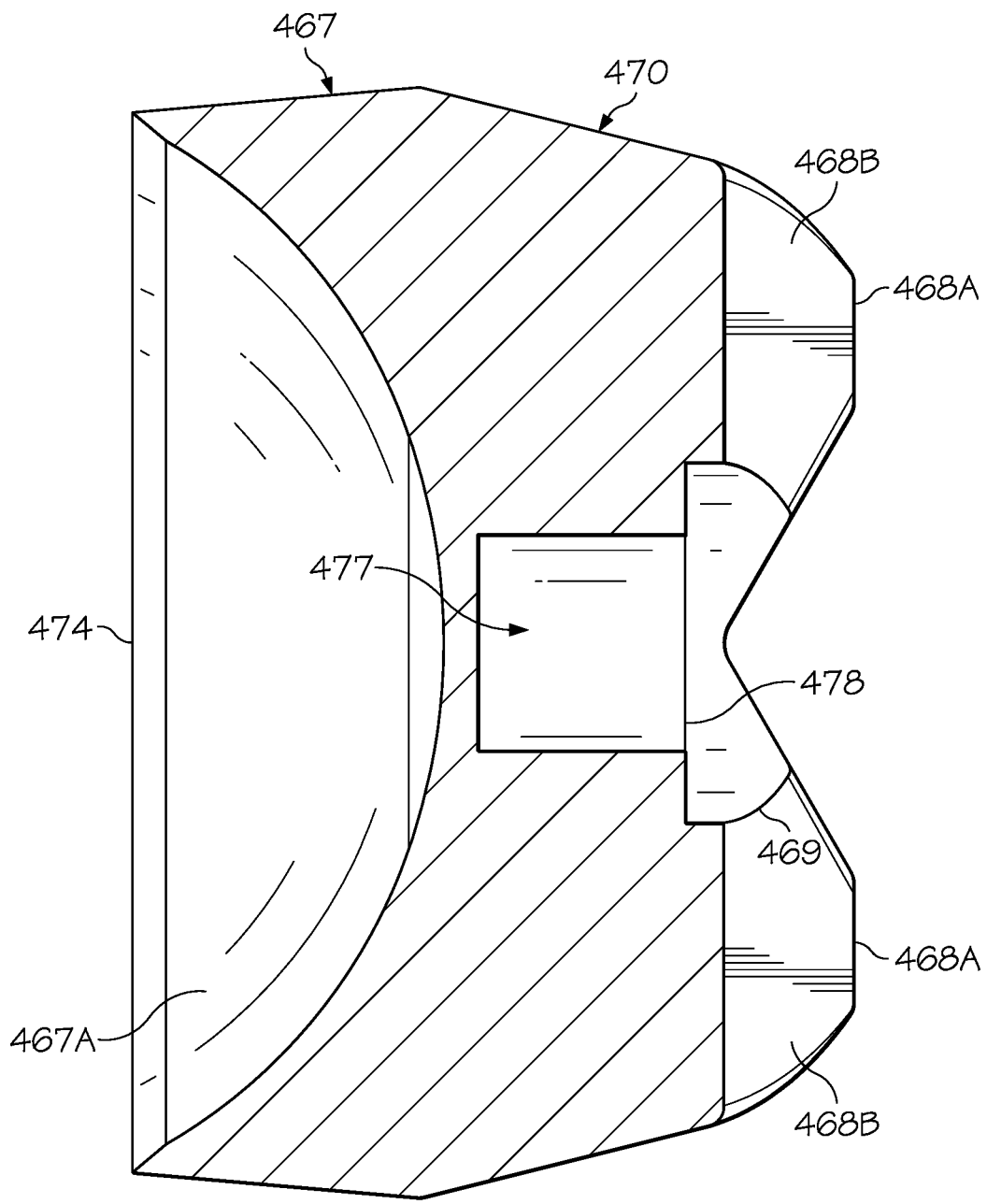
FIG. 14J is a cross sectional view of an alternative embodiment of the land preparation tool of FIG. 14A.
Figure 14K:
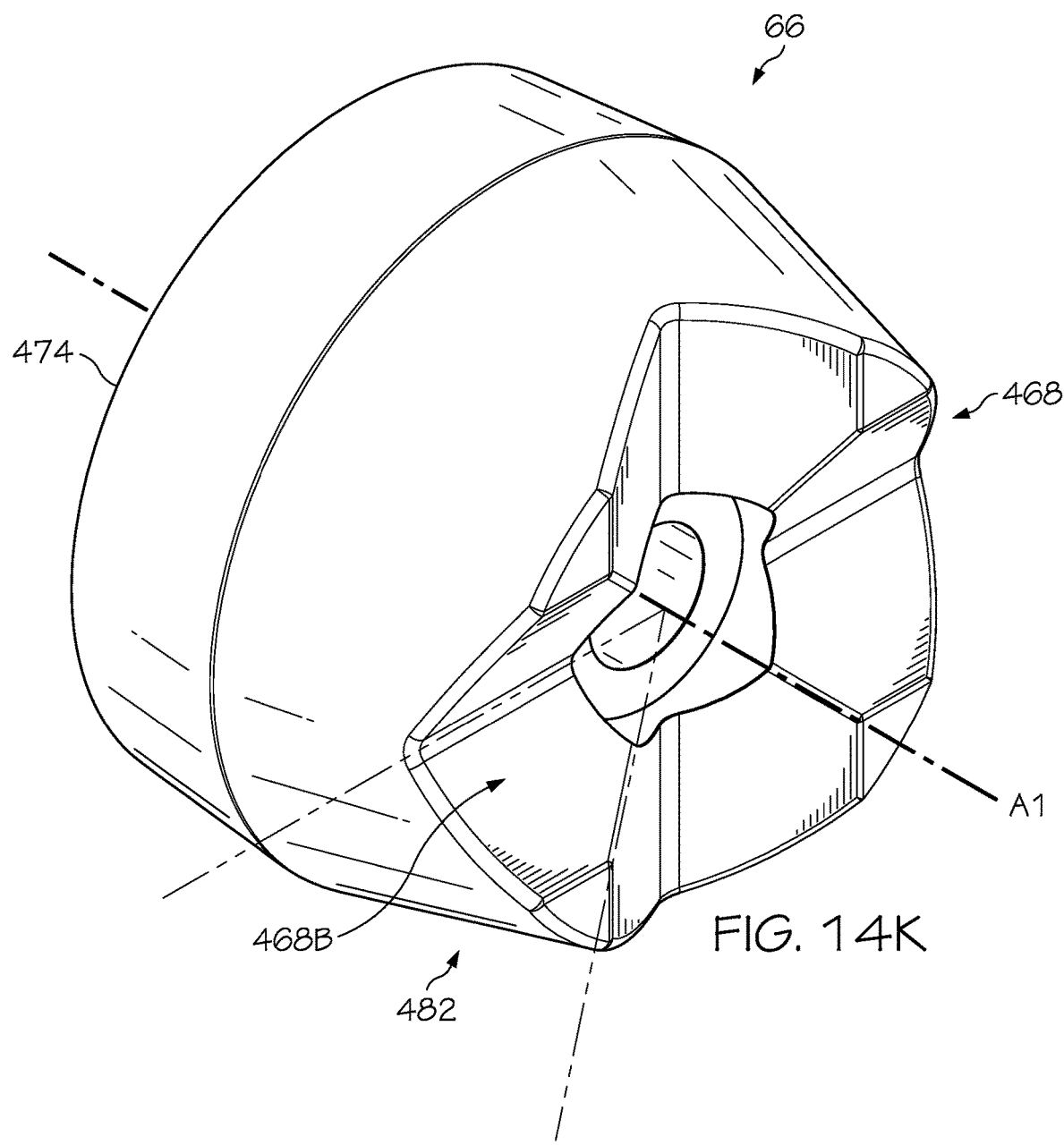
FIG. 14K is an alternate perspective view of the illustrative land preparation tool of FIG. 14A according to one or more embodiments.
Figure 14L:
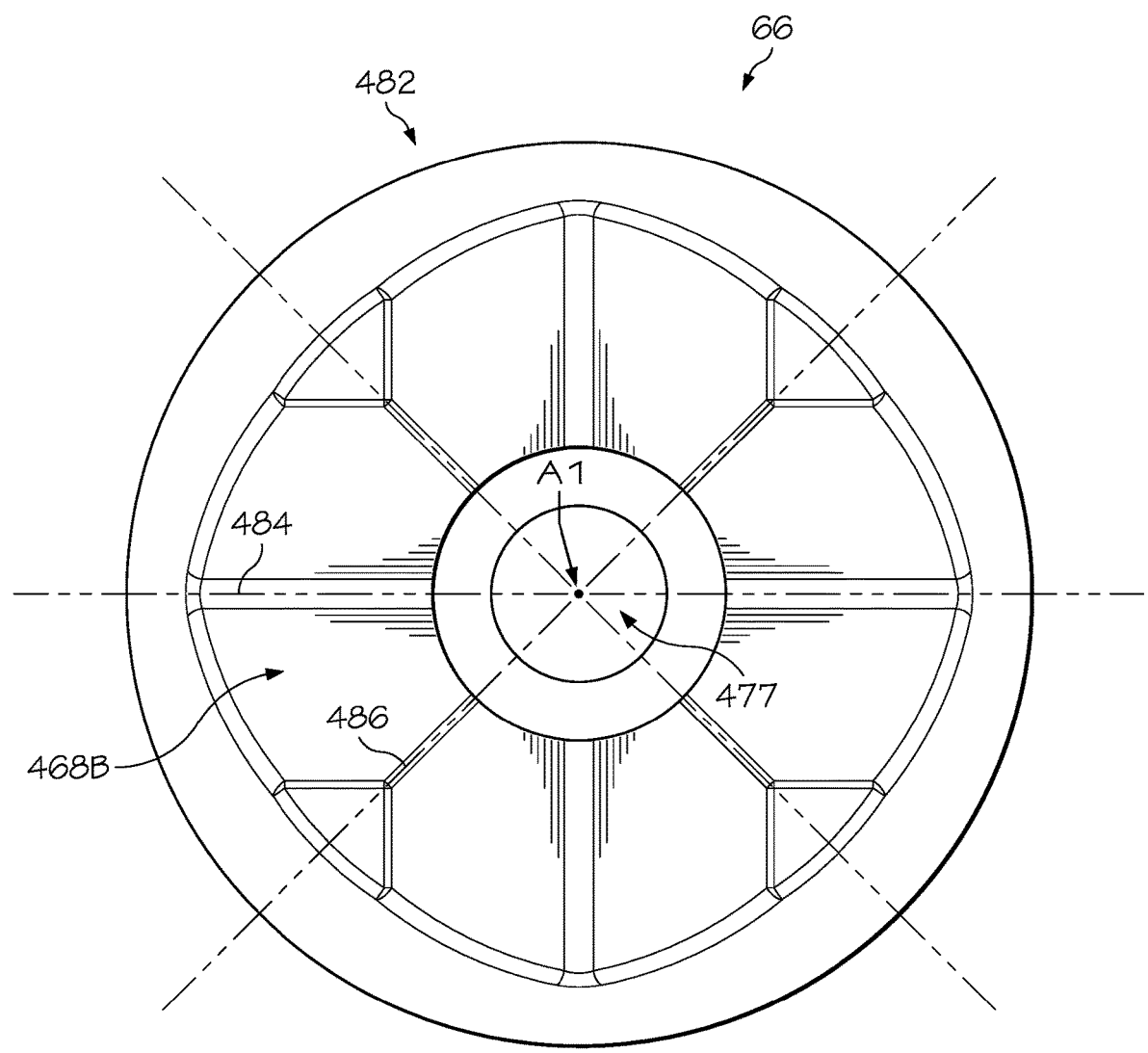
FIG. 14L is an alternate rear elevation view of the illustrative land preparation tool of FIG. 14A according to one or more embodiments.
Figure 15:
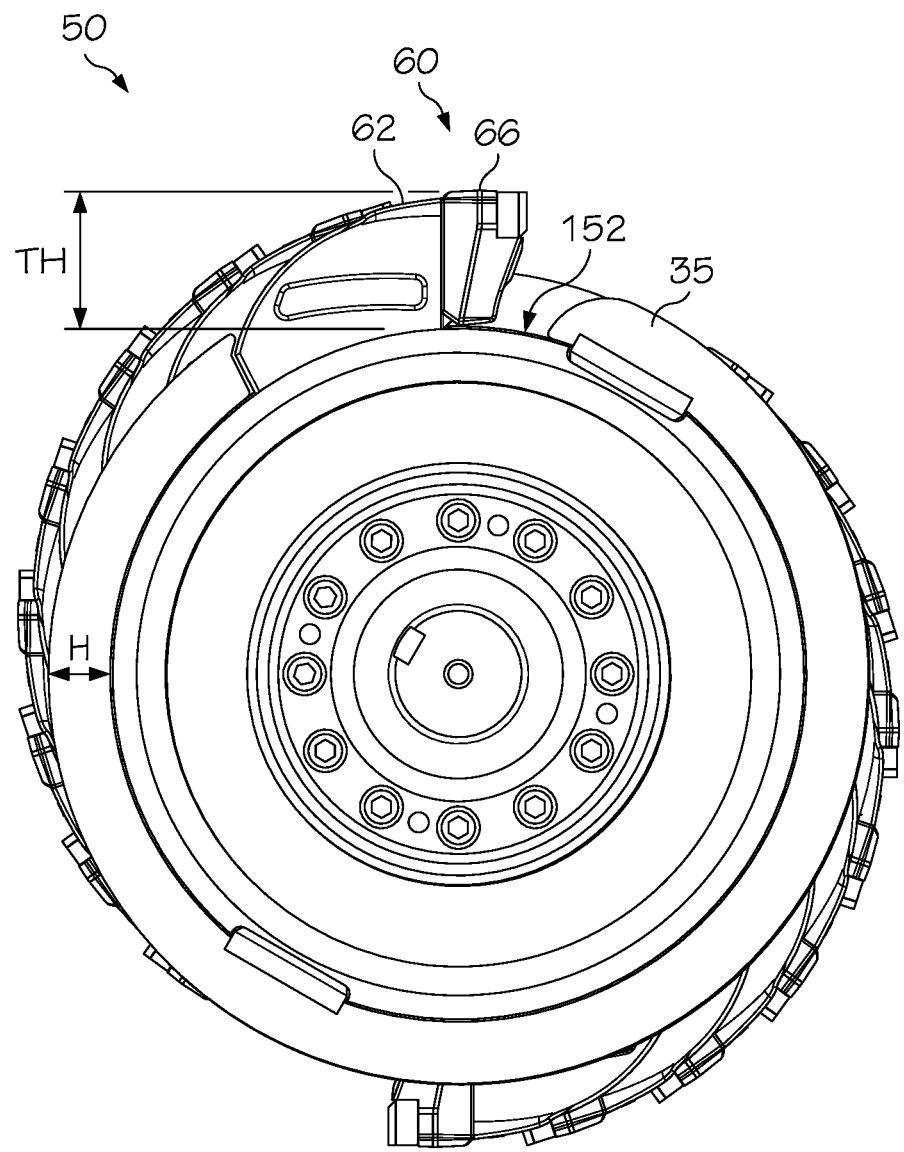
FIG. 15 is a side view of an illustrative rotatable tool according to one or more embodiments.

The land preparation tools 66 shown in FIGS. 14A-14L can be connected to a rotatable tool 50 comprising a rotatable drum 52 or rod and a plurality of tool assemblies 60, as discussed above, particularly with respect to FIG. 3B. In an embodiment, the land preparation tools 66 shown in in FIGS. 14A-14L can be connected to a rotatable tool 50, as shown in FIG. 15, described more fully below. In some embodiments, a tool assembly 60 may include a tool holder 62, and the tool holder 62 may include a bushing or peg (not shown) as discussed above with respect to FIGS. 4A and 4B. Likewise, in some embodiments, the bushing or rounded peg of the tool holder 62 may be matingly inserted into the recess 469 of the land preparation tool 66. As discussed above, the tool holder 62 and the land preparation tool 66, as well as any optional intermediate connector 76 utilized, can be secured by one or more securing bolts 90. For example, in an embodiment, such as the one as shown in FIG. 14H, the channel 477 can be a through-hole, and a securing bolt (not shown) can extend through both the tool holder 62 and the land preparation tool 66 and secure, for example, the land preparation tool 66 to the tool holder 62 with a nut, a locking nut, a nut and washer combination, and the like. In another embodiment, such as the one shown in FIG. 14J, the channel 477 can be a blind bore comprising internal threads to which a securing bolt (not shown) can be threaded. For example, a securing bolt can extend through a tool holder 62 and be threaded into the channel 477 through mounting interface 468. In some embodiments, the tool holder 62 may not include the bushing or rounded peg and the land preparation tool 66 may also not include the recess 469.

FIG. 15 shows an illustrative embodiment of a rotatable tool 50 comprising a rotatable drum 152 or rod and a plurality of tool assemblies 60 spaced along, attached to, and extending radially from the tool drum 152. The rotatable drum 152 includes a plurality of depth control rings 35 that may be attached to and extend from the drum 152. The tool holder 62 of each tool assembly 60 may be coupled to a depth control ring 35. Each tool assembly 60 may also include a fastening device that detachably connects the cutting tool 66 to the tool holder 62. An inner diameter of the depth control ring 35 may be disposed about the outer drum shell. In some embodiments, the depth control ring 35 is fixedly coupled (e.g., welded, epoxied, screwed, bolted, braised, bonded, etc.) to the outer drum shell. In other embodiments, the depth control ring 35 is detachably coupled to the outer drum shell through conventional and/or yet-to-be developed mechanisms. In either case, the depth control ring 35 extends radially from the outer drum shell at a depth height (H). The depth height (H) of the depth control ring 35 may be varied to provide a desired distance between an maximum radial dimension of the land preparation tool 66 and a peripheral edge of the depth control ring 35 and/or the surface of the outer drum shell. In the illustrative embodiment, the depth height (H) of the depth control ring 35 is less than the overall height TH of the tool assembly 60. For example, in some embodiments, the depth height (H) of the depth control ring 35 is less than or equal to half of the overall height TH of the tool assembly 60 when installed. In some embodiments, the depth height (H) of the depth control ring 35 can be about 20% to about 80%, or about 30% to about 60% of the overall height TH of the tool assembly 60 when installed. It should be appreciated, however, that the depth height (H) of the depth control ring 35 can be less than, greater than, or equal to any other partial height of the tool assembly 60 when installed. For additional details regarding depth control rings on a rotatable drum, U.S. Publication No. 2017/0079219 A1 has been incorporated by reference herein in its entirety. It should be also appreciated that any of the tools 66 (e.g., the tool 66 depicted in FIGS. 14A-14I and 14K-14L, the alternative tool 66 depicted in FIG. 14J, etc.) can be configured to interface with the tool holder 62 (e.g., the tool holder 62 depicted in FIGS. 4A-4B and FIGS. 6A-6B, FIG. 15, etc.).

It is noted that terms like "specifically," "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

Having described in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A land preparation tool comprising:
a tool body having a longitudinal axis, the tool body comprising a first imaginary plane and a second imaginary plane, the first and second imaginary planes intersecting orthogonally at the longitudinal axis, wherein the tool body comprises:
a concave cutting surface tapering from a proximal midpoint to a distal edge comprising a circular blade;
a multi-faceted surface mounting interface disposed on the tool body opposite the cutting surface, wherein the mounting interface comprises a plurality of beveled surfaces defining a first pair of V-shaped surfaces and a second pair of V-shaped surfaces, wherein a first apex of the first pair of V-shaped surfaces is disposed in the first imaginary plane and a second apex of the second pair of V-shaped surfaces is disposed in the secondary imaginary plane; and
a channel disposed into the mounting interface and extending into the tool body.

2. The land preparation tool according to claim 1, wherein the mounting interface further comprises a plurality of rear surfaces, each of the plurality of rear surfaces being disposed in a plane normal to the longitudinal axis.

3. The land preparation tool according to claim 2, wherein the plurality of rear surfaces comprise four discrete rear surfaces disposed distally from the first apex of the first pair of V-shaped surfaces and the second apex of the second pair of V-shaped surfaces.

4. The land preparation tool according to claim 1, wherein the concave cutting surface is hemispherical shaped.

5. The land preparation tool according to claim 1, further comprising a cylinder-like side surface extending between the cutting surface and the mounting interface.

6. The land preparation tool according to claim 2, wherein the first apex and the second apex are disposed in a plane normal to the longitudinal axis and intersect at the longitudinal axis.

7. The land preparation tool according to claim 1, wherein the cutting surface is symmetrical about the first imaginary plane and the second imaginary plane.

8. The land preparation tool according to claim 1, wherein the mounting interface is symmetrical about the first imaginary plane and the second imaginary plane.

9. The land preparation tool according to claim 1, wherein the channel extends entirely through the tool body and the cutting surface.

10. The land preparation tool according to claim 1, wherein the channel extends partially into the tool body from an opening disposed in mounting interface.

11. A land preparation tool comprising:
a tool body having a longitudinal axis, the tool body comprising a first imaginary plane and a second imaginary plane, the first and second imaginary planes intersecting orthogonally at the longitudinal axis, wherein the tool body comprises:
a concave cutting surface tapering from a proximal midpoint to a distal edge comprising a circular blade, wherein the cutting surface is symmetrical about the first imaginary plane and the second imaginary plane;
a multi-faceted surface mounting interface disposed on the tool body opposite the cutting surface, wherein the mounting interface comprises a plurality of beveled surfaces defining a first pair of V-shaped surfaces and a second pair of V-shaped surfaces, wherein a first apex of the first pair of V-shaped surfaces is disposed in the first imaginary plane and a second apex of the second pair of V-shaped surfaces is disposed in the secondary imaginary plane; and
a channel disposed into the mounting interface and extending into the tool body.

12. The land preparation tool according to claim 11, wherein the mounting interface further comprises a plurality of rear surfaces, each of the plurality of rear surfaces being disposed in a plane normal to the longitudinal axis.

13. The land preparation tool according to claim 12, wherein the plurality of rear surfaces comprise four discrete rear surfaces disposed distally from the first apex of the first pair of V-shaped surfaces and the second apex of the second pair of V-shaped surfaces.

14. The land preparation tool according to claim 11, wherein the concave cutting surface is hemispherical shaped.

15. The land preparation tool according to claim 11, further comprising a cylinder-like side surface extending between the cutting surface and the mounting interface.

16. The land preparation tool according to claim 12, wherein the first apex and the second apex are disposed in a plane normal to the longitudinal axis and intersect at the longitudinal axis.

17. A land preparation apparatus, comprising:
a rotatable drum;
a plurality of tool holders arranged on the rotatable drum, wherein each tool holder comprises a connection interface;
a plurality of land preparation tools, wherein each land preparation tool is configured to connect with a tool holder of the plurality of tool holders and wherein at least one land preparation tool comprises a tool body having a longitudinal axis, the tool body comprising a first imaginary plane and a second imaginary plane, the first and second imaginary planes intersecting orthogonally along the longitudinal axis, wherein the tool body comprises:
a concave cutting surface tapering from a proximal midpoint to a distal edge comprising a circular blade, wherein the cutting surface is symmetrical about the first imaginary plane and the second imaginary plane;
a multi-faceted surface mounting interface disposed on the tool body opposite the cutting surface, wherein the mounting interface comprises a plurality of beveled surfaces defining a first pair of V-shaped surfaces and a second pair of V-shaped surfaces, wherein a first apex of the first pair of V-shaped surfaces is disposed in the first imaginary plane and a second apex of the second pair of V-shaped surfaces is disposed in the secondary imaginary plane; and
a channel disposed into the mounting interface and extending into the tool body.

18. The land preparation tool according to claim 17, wherein the concave cutting surface is hemispherical shaped.

19. The land preparation tool according to claim 17, wherein the first apex and the second apex are disposed in a plane normal to the longitudinal axis and intersect at the longitudinal axis.

20. The land preparation tool according to claim 17, wherein the channel extends entirely through the tool body and the cutting surface.

* * * * *